US006724954B2

(12) United States Patent
Arai et al.

(10) Patent No.: US 6,724,954 B2
(45) Date of Patent: Apr. 20, 2004

(54) OPTICAL MULTIPLEXER/DEMULTIPLEXER

(75) Inventors: Hideaki Arai, Ibaraki (JP); Takafumi Chiba, Ibaraki (JP); Hisato Uetsuka, Ibaraki (JP)

(73) Assignee: Hitachi Cable, Inc., Tokyo (JP)

( * ) Notice: Subject to any disclaimer, the term of this patent is extended or adjusted under 35 U.S.C. 154(b) by 26 days.

(21) Appl. No.: 09/796,536

(22) Filed: Mar. 2, 2001

(65) Prior Publication Data

US 2001/0048786 A1 Dec. 6, 2001

(30) Foreign Application Priority Data

Mar. 3, 2000 (JP) ...................................... 2000-063301

(51) Int. Cl.[7] .............................................. G02B 6/28
(52) U.S. Cl. .............................. 385/24; 389/27; 389/42
(58) Field of Search ............................... 385/24, 3, 4, 9, 385/14, 15, 17, 31, 34, 41, 42

(56) References Cited

U.S. PATENT DOCUMENTS

| | | | | |
|---|---|---|---|---|
| 4,679,893 A | * | 7/1987 | Ramer | 385/9 |
| 5,307,428 A | * | 4/1994 | Blow et al. | 385/11 |
| 5,414,548 A | * | 5/1995 | Tachikawa et al. | 359/130 |
| 5,444,724 A | * | 8/1995 | Goto | 372/20 |
| 5,572,611 A | * | 11/1996 | Jinguji et al. | 385/17 |
| 5,596,661 A | * | 1/1997 | Henry et al. | 385/24 |
| 5,625,479 A | * | 4/1997 | Suzuki et al. | 359/135 |
| 5,835,199 A | * | 11/1998 | Phillips et al. | 356/5.03 |
| 5,852,505 A | * | 12/1998 | Li | 359/118 |
| 5,867,293 A | * | 2/1999 | Kotten | 359/161 |
| 5,917,973 A | * | 6/1999 | Iwasaki | 385/45 |
| 6,363,184 B2 | * | 3/2002 | Cao | 385/24 |
| 6,417,945 B2 | * | 7/2002 | Ishikawa et al. | 359/124 |

* cited by examiner

Primary Examiner—Frank G. Font
Assistant Examiner—Kaveh Kianni
(74) Attorney, Agent, or Firm—Antonelli, Terry, Stout & Kraus, LLP

(57) ABSTRACT

In an optical multiplexer/demultiplexer comprising optical multiplexer/demultiplexer circuits connected in multistage, the optical multiplexer/demultiplexer circuits each have two input ports and two output ports, an optical path, through which input optical signals with predetermined wavelengths are output after multiplexing and demultiplexing, varies depending upon the input port; the optical paths in each of the optical multiplexer/demultiplexer circuits have mutually opposite wavelength dispersion characteristics, and one of the optical paths in a first optical multiplexer/demultiplexer circuit is connected to one of the optical paths, in a second optical multiplexer/demultiplexer circuit, having wavelength dispersion characteristics opposite to the optical path in the first optical multiplexer/demultiplexer circuit. By virtue of this construction, an optical multiplexer/demultiplexer can be realized which causes no significant wavelength dispersion and, at the same time, has excellent wavelength flatness characteristics in passband.

6 Claims, 24 Drawing Sheets

1: QUARTZ SUBSTRATE
2a: MULTI-STAGE MACH-ZEHNDER INTERFERENCE CIRCUIT
2b: MULTI-STAGE MACH-ZEHNDER INTERFERENCE CIRCUIT
2c: MULTI-STAGE MACH-ZEHNDER INTERFERENCE CIRCUIT
3: INPUT PORT
4: OUTPUT PORT
5: OUTPUT PORT
$\lambda$: OPTICAL SIGNAL

λ : OPTICAL SIGNAL

λ : OPTICAL SIGNAL

λ : OPTICAL SIGNAL

λ : OPTICAL SIGNAL

OPTICAL MULTIPLEXER/DEMULTIPLEXER

FIELD OF THE INVENTION

The invention relates to an optical multiplexer/demultiplexer, particularly to an optical multiplexer/demultiplexer which can significantly reduce the wavelength dispersion, and further to an optical multiplexer/demultiplexer which can simultaneously perform multiplexing processing and demultiplexing processing.

BACKGROUND OF THE INVENTION

An interleave system, which is one form of advanced wavelength multiplexing communications, requires an optical multiplexer/demultiplexer having a function such that a signal with certain channel wavelength spacings is demultiplexed to two signals with doubled channel wavelength spacings, or conversely, two signals are multiplexed to one signal.

FIG. 12 is an explanatory view showing one example of a prior art technique for coping with this demand. Since a broad and flat wavelength passband is required of the optical multiplexer/demultiplexer used in the interleave, as shown in FIG. 12, the prior art technique has adopted a multistage-connected construction of Mach-Zehnder interference circuits which each comprise four optical couplers (directional couplers) 24, 25, 26, 27 and waveguide pairs each comprising two waveguides with different lengths (28, 29), (30, 31), (32, 33), for connecting the optical couplers to each other (see, for example, U.S. Pat. No. 5,852,505).

FIG. 13 shows a spectral response for an input/output port 22 in the case where a white light source is input through an input/output port 21, and FIG. 14 a spectral response for an input/output port 23. When signals $_1, _2, _3, _4$ with channel spacings of about 0.4 nm (frequency 50 GHz) are input through the port 21, $_1$ and $_3$ are output through the port 22 while $_2$ and $_4$ are output through the port 23. In this case, the output signals have channel wavelength spacings of about 0.8 nm (frequency 100 GHz). The multistage construction of Mach-Zehnder interference circuits shown in FIG. 12 has an advantage that, as shown in wavelength loss characteristics in FIGS. 13 and 14, a broad and flat passband can be provided.

The optical multiplexer/demultiplexer shown in FIG. 12, however, suffers from a problem that the realization of good loss wavelength flatness disadvantageously leads to wavelength dispersion.

FIG. 15 shows wavelength dispersion characteristics for a path wherein optical signals are input through the port 21 and output through the port 22, and FIG. 16 wavelength dispersion characteristics for a path wherein optical signals are input through the port 21 and output through the port 23. For both the drawings, in the abscissa, frequency is used instead of the wavelength, while the ordinate represents only dispersion around passbands (around $_1$ passband and around $_2$ passband). As is apparent from the drawings, the dispersion around the passbands is about 30 ps/nm. This value, of course, varies depending upon parameters. In theory, however, it is unavoidable that improving the loss wavelength flatness leads to dispersion. This wavelength dispersion is significantly disadvantageous in terms of transmission speed of the system and relay distance.

Further, the conventional optical multiplexer/demultiplexer can have both optical multiplexing and optical demultiplexing functions. However, multiplexing processing and demultiplexing processing of a plurality of optical signals derived from different signal sources could not have been simultaneously performed in a single optical multiplexer/demultiplexer. This has necessitated the provision of at least one optical multiplexer/demultiplexer for multiplexing and at least one optical multiplexer/demultiplexer for demultiplexing. Therefore, a space for the necessary number of optical multiplexer/demultiplexers should be provided.

SUMMARY OF THE INVENTION

Accordingly, it is an object of the invention to solve the above problem of the prior art and to provide an optical multiplexer/demultiplexer which causes no significant wavelength dispersion (theoretically has no wavelength dispersion) and, at the same time, has excellent wavelength flatness characteristics in passband.

It is another object of the invention to realize an optical multiplexer/demultiplexer which can reduce the space necessary for the optical multiplexer/demultiplexer to perform the multiplexing processing and demultiplexing processing of a plurality of optical signals derived from different signal sources.

According to the first feature of the invention, an optical multiplexer/demultiplexer comprises optical multiplexer/demultiplexer circuits connected in multistage, wherein:

the optical multiplexer/demultiplexer circuits each have two input ports and two output ports;

an optical path, through which input optical signals with predetermined wavelengths are output after multiplexing and demultiplexing, varies depending upon the input port;

the optical paths in each of the optical multiplexer/demultiplexer circuits have mutually opposite wavelength dispersion characteristics; and one of the optical paths in a first optical multiplexer/demultiplexer circuit is connected to one of the optical paths in a second optical multiplexer/demultiplexer circuit, having wavelength dispersion characteristics opposite to the optical path in the first optical multiplexer/demultiplexer circuit.

This optical multiplexer/demultiplexer may comprise two optical multiplexer/demultiplexer circuits connected to each other, wherein:

said optical multiplexer/demultiplexer circuits each have a waveguide with first and third ports as terminals and a waveguide with second and fourth ports as terminals, and have optical multiplexing/demultiplexing characteristics such that, for optical signals with predetermined wavelengths, the optical signals input through the first port are output through the third port while optical signals input through the second port are output through the fourth port;

the wavelength dispersion characteristics, in the case where the optical signals are input through the first port and output through the third port, are opposite to the wavelength dispersion characteristics in the case where the optical signals are input through the second port and output through the fourth port; and the third port in the first optical multiplexer/demultiplexer circuit, when the first port in the first optical multiplexer/demultiplexer circuit is used as an input port, is connected to the second port in the second optical multiplexer/demultiplexer circuit while the fourth port in the second optical multiplexer/ demultiplexer circuit is used as an output port for optical signals with predetermined wavelengths.

Further, the optical multiplexer/demultiplexer may comprise two optical multiplexer/demultiplexer circuits connected to each other, wherein:

said optical multiplexer/demultiplexer circuits each have a waveguide with first and third ports as terminals and a waveguide with second and fourth ports as terminals, and have optical multiplexing/demultiplexing characteristics such that, for optical signals with predetermined wavelengths, the optical signals input through the first port are output through the fourth port while optical signals input through the second port are output through the third port;

the wavelength dispersion characteristics, in the case where the optical signals are input through the first port and output through the fourth port, are opposite to the wavelength dispersion characteristics in the case where the optical signals are input through the second port and output through the third port; and the fourth port in the first optical multiplexer/demultiplexer circuit, when the first port in the first optical multiplexer/demultiplexer circuit is used as an input port, is connected to the second port in the second optical multiplexer/demultiplexer circuit while the third port in the second optical multiplexer/demultiplexer circuit is used as an output port for optical signals with predetermined wavelengths.

Furthermore, the optical multiplexer/demultiplexer may comprise three optical multiplexer/demultiplexer circuits integrated with each other, wherein:

said optical multiplexer/demultiplexer circuits each have a waveguide with first and third ports as terminals and a waveguide with second and fourth ports as terminals;

said optical multiplexer/demultiplexer circuits have optical multiplexing/demultiplexing characteristics such that, for optical signals with predetermined wavelengths, the optical signals input through the first port are output through the third port while optical signals input through the second port are output through the fourth port, and the wavelength dispersion characteristics, in the case where the optical signals are input through the first port and output through the third port, are opposite to the wavelength dispersion characteristics in the case where the optical signals are input through the second port and output through the fourth port;

for other optical signals with predetermined wavelengths, the optical multiplexing/demultiplexing characteristics are such that the optical signals input through the first port are output through the fourth port while optical signals input through the second port are output through the third port, and the wavelength dispersion characteristics, in the case where the optical signals are input through the first port and output through the fourth port, are opposite to the wavelength dispersion characteristics in the case where the optical signals are input through the second port and output through the third port;

the third port in the first optical multiplexer/demultiplexer circuit, when the first port in the first optical multiplexer/demultiplexer circuit is used as an input port, is connected to the second port in the second optical multiplexer/demultiplexer circuit, and the fourth port in the first optical multiplexer/demultiplexer circuit is connected to the second port in the third optical multiplexer/demultiplexer circuit; and the fourth port in the second optical multiplexer/demultiplexer circuit is used as an output port for optical signals with predetermined wavelengths while the third port in the third optical multiplexer/demultiplexer circuit is used as an output port for other optical signals with predetermined wavelengths.

Furthermore, the optical multiplexer/demultiplexer may comprise two optical multiplexer/demultiplexer circuits connected to each other, wherein:

said optical multiplexer/demultiplexer circuits each have a waveguide with first and third ports as terminals and a waveguide with second and fourth ports as terminals, and have optical multiplexing/demultiplexing characteristics such that, for optical signals with predetermined wavelengths, the optical signals input through the first port are output through the third port while optical signals input through the second port are output through the fourth port;

the wavelength dispersion characteristics, in the case where the optical signals are input through the first port and output through the third port, are opposite to the wavelength dispersion characteristics in the case where the optical signals are input through the second port and output through the fourth port; and the third port in the first optical multiplexer/demultiplexer circuit, when the first port in the first optical multiplexer/demultiplexer circuit is used as an input port, is connected to the fourth port in the second optical multiplexer/demultiplexer circuit while the second port in the second optical multiplexer/demultiplexer circuit is used as an output port for optical signals with predetermined wavelengths.

Furthermore, the optical multiplexer/demultiplexer may comprise two optical multiplexer/demultiplexer circuits connected to each other, wherein:

said optical multiplexer/demultiplexer circuits each have a waveguide with first and third ports as terminals and a waveguide with second and fourth ports as terminals, and have optical multiplexing/demultiplexing characteristics such that, for optical signals with predetermined wavelengths, the optical signals input through the first port are output through the fourth port while optical signals input through the second port are output through the third port;

the wavelength dispersion characteristics, in the case where the optical signals are input through the first port and output through the fourth port, are opposite to the wavelength dispersion characteristics in the case where the optical signals are input through the second port and output through the third port; and the fourth port in the first optical multiplexer/demultiplexer circuit, when the first port in the first optical multiplexer/demultiplexer circuit is used as an input port, is connected to the third port in the second optical multiplexer/demultiplexer circuit while the second port in the second optical multiplexer/demultiplexer circuit is used as an output port for optical signals with predetermined wavelengths.

Furthermore, the optical multiplexer/demultiplexer may comprise three optical multiplexer/demultiplexer circuits integrated with each other, wherein:

said optical multiplexer/demultiplexer circuits each comprise a waveguide with first and third ports as terminals and a waveguide with second and fourth ports as terminals;

said optical multiplexer/demultiplexer circuits have optical multiplexing/demultiplexing characteristics such that, for optical signals with predetermined wavelengths, the optical signals input through the first port are output through the third port while optical signals input through the second port are output through the fourth port, and the wavelength dispersion characteristics, in the case where the optical signals are input through the first port and output through the third port, are opposite to the wavelength dispersion characteristics in the case where the optical signals are input through the second port and output through the fourth port;

for other optical signals with predetermined wavelengths, the optical multiplexing/demultiplexing characteristics are such that the optical signals input through the first port are output through the fourth port while optical signals input through the second port are output through the third port, and the wavelength dispersion characteristics, in the case where the optical signals are input through the first port and output through the fourth port, are opposite to the wavelength dispersion characteristics in the case where the optical signals are input through the second port and output through the third port;

the third port in the first optical multiplexer/demultiplexer circuit, when the first port in the first optical multiplexer/demultiplexer circuit is used as an input port, is connected to the fourth port in the second optical multiplexer/demultiplexer circuit, and the fourth port in the first optical multiplexer/demultiplexer circuit is connected to the third port in the third optical multiplexer/demultiplexer circuit; and the second port in the second optical multiplexer/demultiplexer circuit is used as an output port for optical signals with predetermined wavelengths while the second port in the third optical multiplexer/demultiplexer circuit is used as an output port for other optical signals with predetermined wavelengths.

The optical multiplexer/demultiplexer circuits are preferably constructed so that Mach-Zehnder interference circuits each comprising a plurality of optical couplers, including directional couplers, and two waveguides, with different lengths, connecting the optical couplers to each other are connected in multistage.

Further, the Mach-Zehnder interference circuits each preferably comprise a quartz-based plane optical waveguide substrate. In this case, since three Mach-Zehnder interference circuits can be integrated on a single substrate, the size of the optical multiplexer/demultiplexer can be reduced as compared with the case where three Mach-Zehnder interference circuits are connected through an optical fiber.

Still further, according to another feature of the invention, an optical multiplexer/demultiplexer comprises: first, second, and third optical multiplexer/demultiplexer circuits each having a plurality of optical paths including waveguides; and first, second, and third optical isolators, wherein said optical multiplexer/demultiplexer circuits each have first, second, third, and fourth ports respectively at the terminals of the optical paths, and the first and second ports are connected to the third and forth ports through the optical paths including waveguides, an optical signal with a first predetermined wavelength, when input into the first port, is passed through the first optical path and is output through the third port; and the optical signal with the first wavelength, when input into the fourth port, is passed through the second optical path and is output through the second port, the wavelength dispersion characteristics of the first optical path being opposite to the wavelength dispersion characteristics of the second optical path with respect to the optical signal with a first wavelength, an optical signal with a second predetermined wavelength, when input into the first port, is passed through the third optical path and is output through the fourth port; the optical signal with the second wavelength, when input into the fourth port, is passed through the third optical path and is output through the first port; and the optical signal with the second wavelength, when input into the third port, is passed through the fourth optical path and is output through the second port, the wavelength dispersion characteristics of the third optical path being opposite to the wavelength dispersion characteristics of the fourth optical path with respect to the optical signal with a second wavelength, said first optical isolator is connected to the first port, on its input side, of the first optical multiplexer/demultiplexer circuit so that the optical signal with the first or second wavelength is input into the first optical multiplexer/demultiplexer circuit through the first optical isolator, said second optical isolator is connected to the first port, on its external side, of the second optical multiplexer/demultiplexer circuit, and the third optical isolator is connected to the first port, on its external side, of the third optical multiplexer/demultiplexer circuit, the third port of the first optical multiplexer/demultiplexer circuit is connected to the fourth port of the second optical multiplexer/demultiplexer circuit, while the fourth port of the first optical multiplexer/demultiplexer circuit is connected to the third port of the third optical multiplexer/demultiplexer circuit, said optical signal with the first wavelength, when input into the first port of the first optical multiplexer/demultiplexer circuit through the first optical isolator, is passed through the first optical path of the first optical multiplexer/demultiplexer circuit and the second optical path of the second optical multiplexer/demultiplexer circuit to perform optical multiplexing/demultiplexing, followed by the output of the multiplexed/demultiplexed signal through the second port of the second optical multiplexer/demultiplexer circuit, said optical signal with the first wavelength, when input into the first port of the third optical multiplexer/demultiplexer circuit through the third optical isolator, is passed through the first optical path of the third optical multiplexer/demultiplexer circuit and the second optical path of the first optical multiplexer/demultiplexer circuit to perform optical multiplexing/demultiplexing, followed by the output of the multiplexed/demultiplexed signal through the second port of the first optical multiplexer/demultiplexer circuit, said optical signal with the second wavelength, when input into the first port of the first optical multiplexer/demultiplexer circuit through the first optical isolator, is passed through the third optical path of the first optical multiplexer/demultiplexer circuit and the fourth optical path of the third optical multiplexer/demultiplexer circuit to perform optical multiplexing/demultiplexing, followed by the output of the multiplexed/ demultiplexed signal through the second port of the third optical multiplexer/demultiplexer circuit, and said optical signal with the second wavelength, when input into the first port of the second optical multiplexer/demultiplexer circuit through the second optical isolator, is passed through the third optical path of the second optical multiplexer/demultiplexer circuit and the fourth optical path of the first optical multiplexer/demultiplexer circuit to perform optical multiplexing/demultiplexing, followed by the output of the multiplexed/demultiplexed signal through the second port of the first optical multiplexer/demultiplexer circuit.

BRIEF DESCRIPTION OF THE DRAWINGS

The invention will be explained in more detail in conjunction with the appended drawings, wherein.

DESCRIPTION OF THE PREFERRED EMBODIMENTS

Preferred embodiments of the invention will be explained in conjunction with the accompanying drawings.

Figure 1:
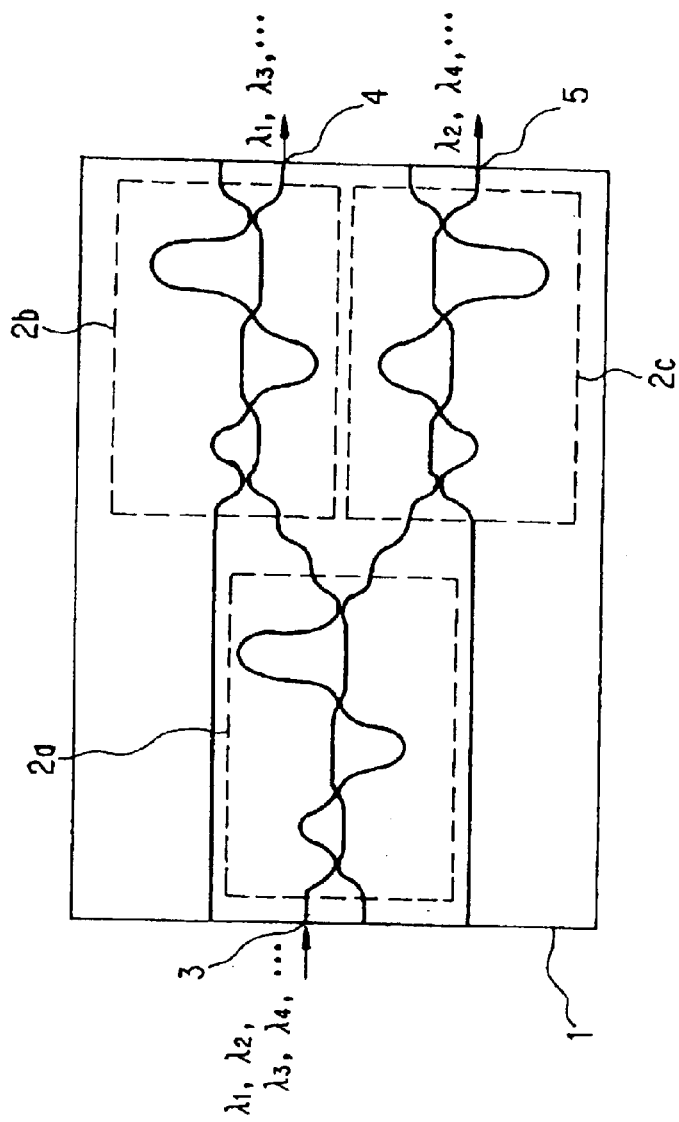
FIG. 1 is an explanatory view showing a preferred embodiment of the invention.

FIG. 1 shows a preferred embodiment of the waveguide-type optical multiplexer/demultiplexer according to the invention.

Figure 2:
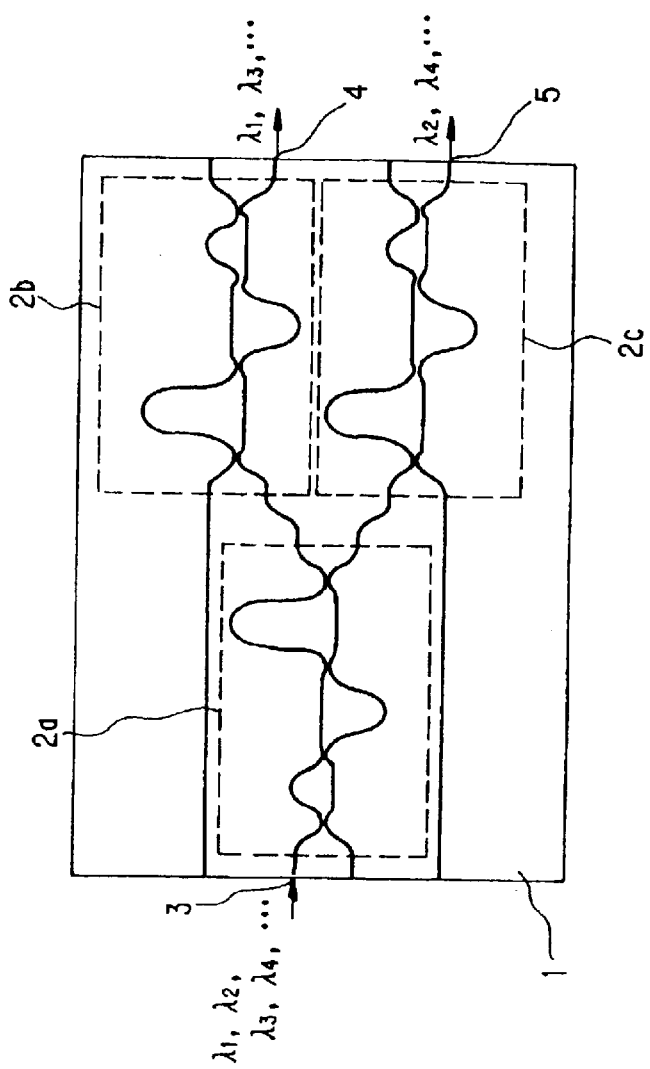
FIG. 2 is an explanatory view showing another preferred embodiment of the invention.

FIG. 2 shows another preferred embodiment of the waveguide-type optical multiplexer/demultiplexer according to the invention.

Both the preferred embodiments have an integrated structure of three Mach-Zehnder interference circuits 2a, 2b, 2c. These three Mach-Zehnder interference circuits 2a, 2b, 2c as constituent units of the waveguide-type optical multiplexer/demultiplexer have the same structure, except that, in FIG. 1, the Mach-Zehnder interference circuit 2c is vertically symmetrical with the Mach-Zehnder interference circuit 2b, while, in FIG. 2, the Mach-Zehnder interference circuit 2a is laterally symmetrical with the Mach-Zehnder interference circuits 2b and 2c.

Figure 3:
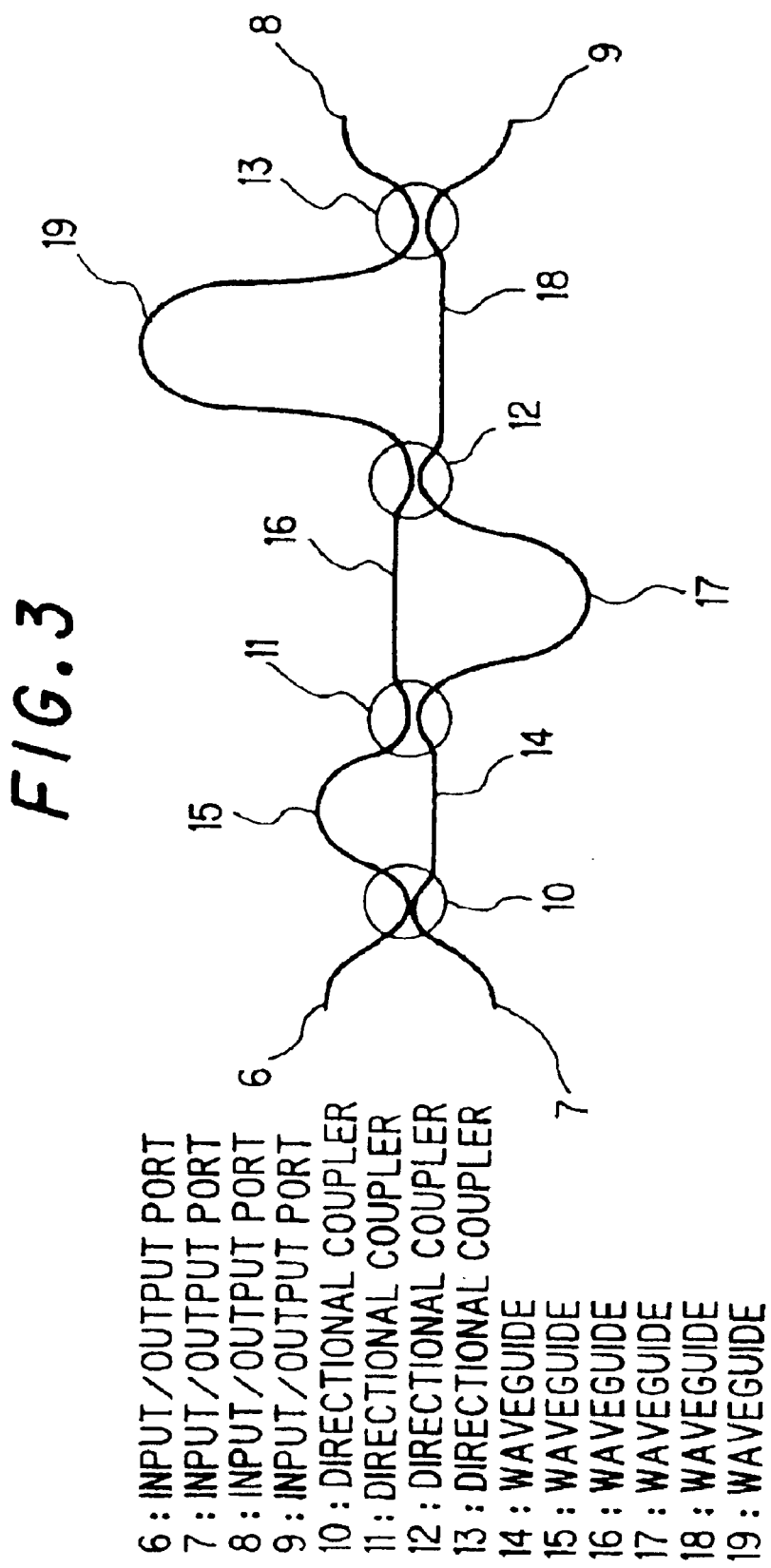
FIG. 3 is an explanatory view showing a Mach-Zehnder interference circuit as a constituent unit of the optical multiplexer/demultiplexer according to the invention.

As shown in FIG. 3, each of the Mach-Zehnder interference circuits 2a, 2b, 2c comprises four directional coupler-type optical couplers 10, 11, 12, 13 and a pair of waveguides (14, 15) which have different lengths and connect the coupler 10 to the coupler 11, a pair of waveguides (16, 17) which have different lengths and connect the coupler 11 to the coupler 12, and a pair of waveguides (18, 19) which have different lengths and connect the coupler 12 to the coupler 13. For the optical couplers 10, 11, the designed value of coupling is about 50%. The optical couplers 10, 11 may be replaced with MMI couplers. For the optical couplers 12, 13, the designed value of coupling is about 2%. Assuming that the difference in length between the waveguides 14 and 15 is L, the equivalent refractive index of the waveguide is Neff, and the center wavelength of a waveband used in this optical multiplexer/demultiplexer is λc, the difference in length between the waveguides 16 and 17 is 2 L while the difference in length between the waveguides 18 and 19 is 4 L−/Neff. In this preferred embodiment, L=2.033 μm, Neff= 1.44, and =1.55 μm. As shown in the drawing, the longer connecting waveguide 15 in the first stage is on the same side as the longer connecting waveguide 19 in the third stage, and the longer waveguide 17 in the second stage is connected on the side opposite to the waveguides 15 and 19. For convenience, numeral 6 designates a first port, numeral 7 a second port, numeral 8 a third port, and numeral 9 a fourth port.

Figure 8:
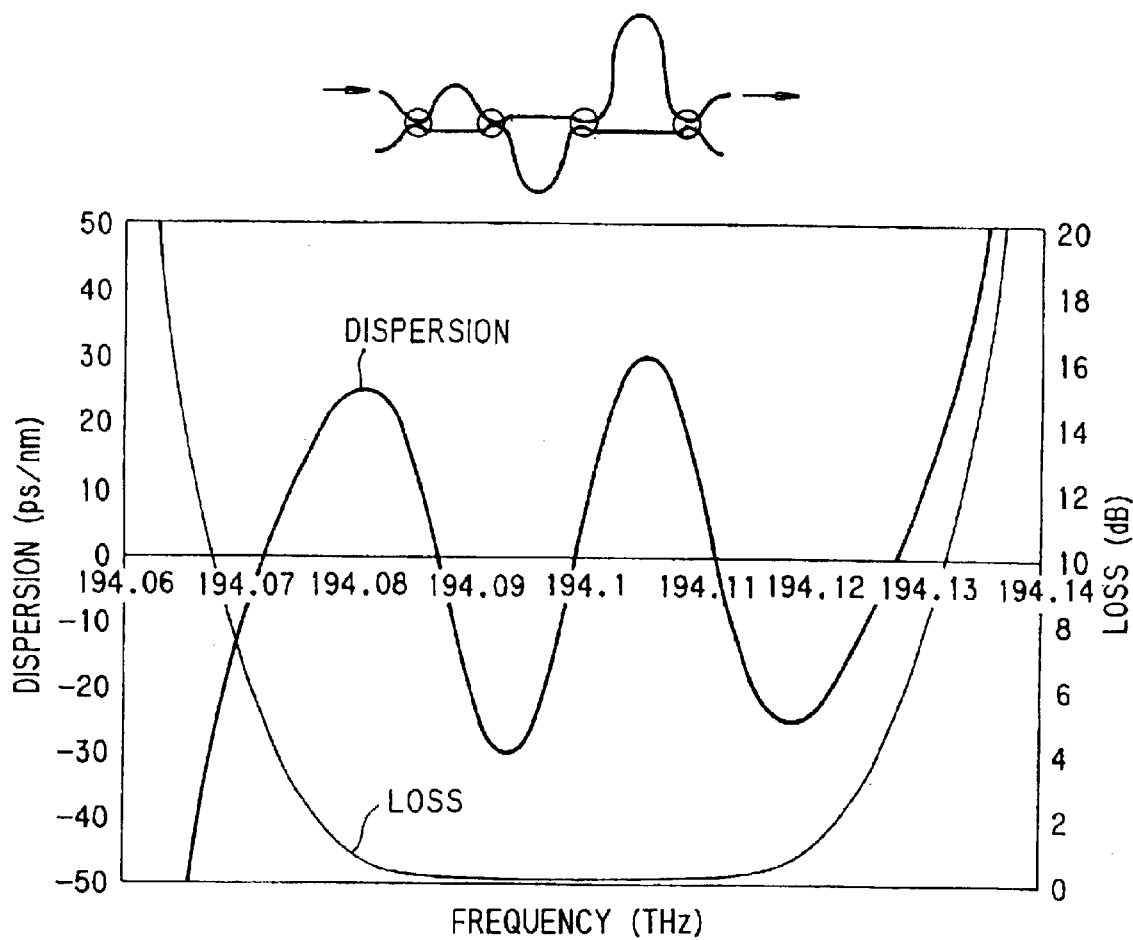
FIG. 8 is an explanatory view showing a difference in wavelength dispersion characteristics according to one combination of input and output ports in the Mach-Zehnder interference circuit and the wavelength flatness of loss for this combination.
Figure 9:
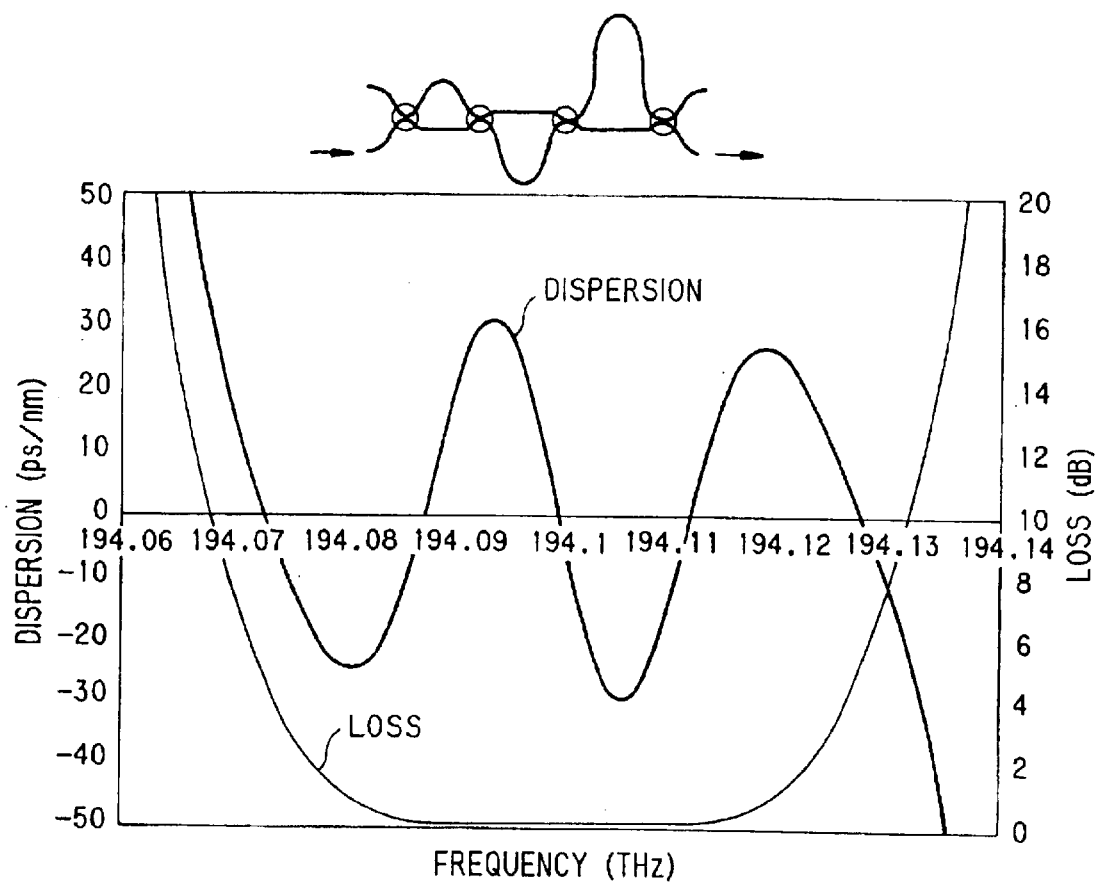
FIG. 9 is an explanatory view showing a difference in wavelength dispersion characteristics according to another combination of input and output ports in the Mach-Zehnder interference circuit and the wavelength flatness of loss for this combination.
Figure 10:
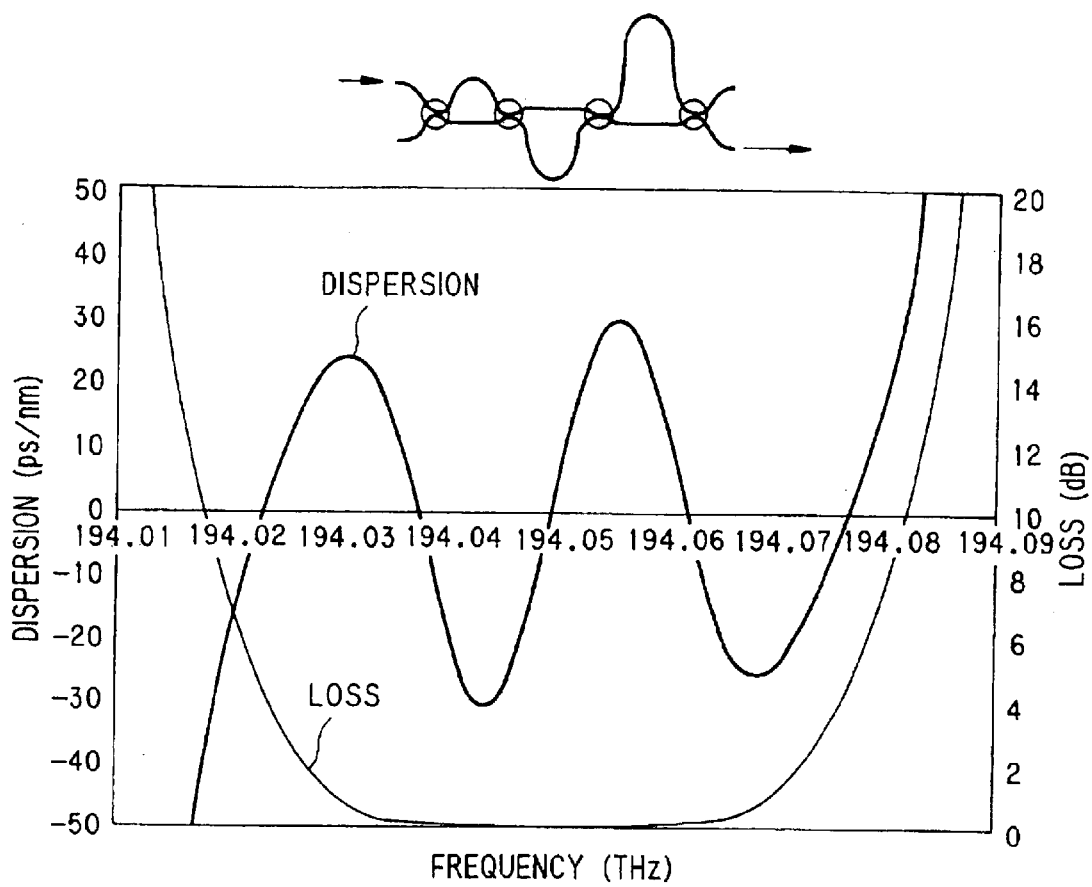
FIG. 10 is an explanatory view showing a difference in wavelength dispersion characteristics according to still another combination of input and output ports in the Mach-Zehnder interference circuit and the wavelength flatness of loss for this combination.
Figure 11:
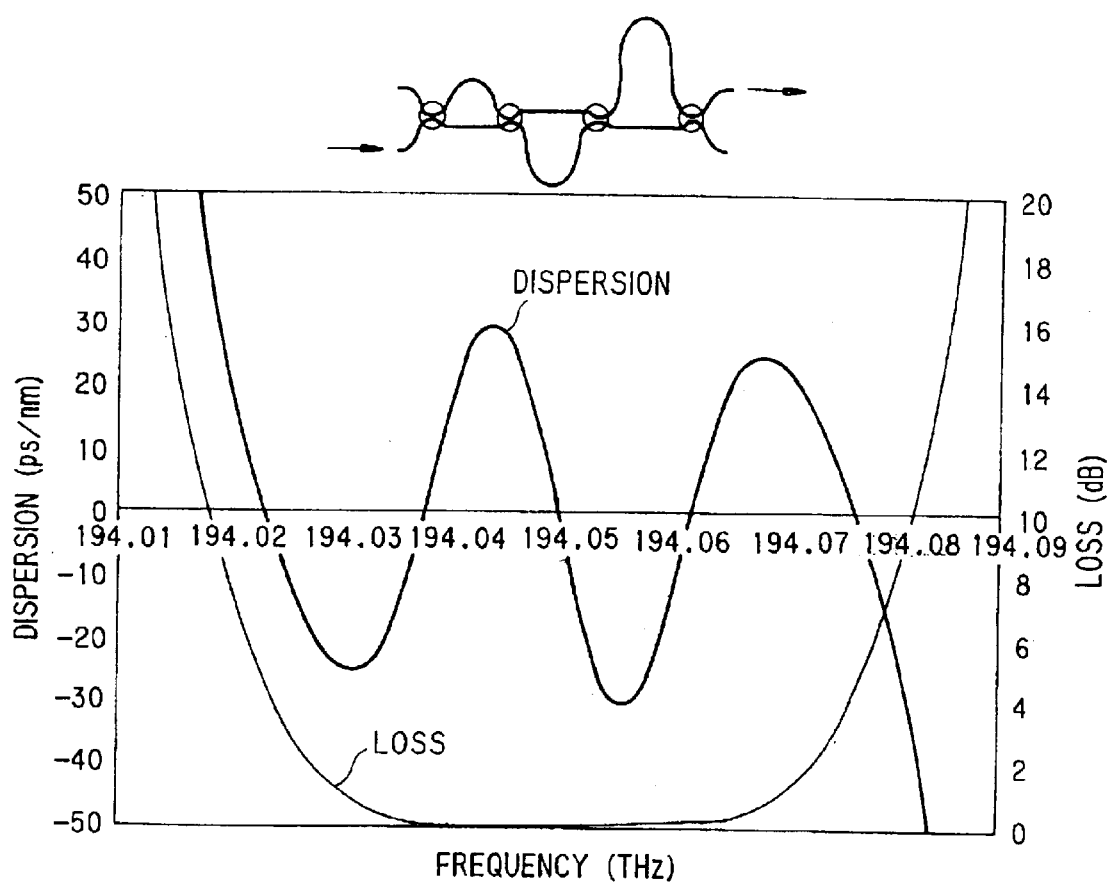
FIG. 11 is an explanatory view showing a difference in wavelength dispersion characteristics according to a further combination of input and output ports in the Mach-Zehnder interference circuit and the wavelength flatness of loss for this combination.

FIGS. 8 to 11 show the wavelength dispersion characteristics of the Mach-Zehnder interference circuit shown in FIG. 3. FIG. 8 shows the wavelength dispersion characteristics and wavelength loss characteristics of a path (an optical path) wherein, in the circuit shown in FIG. 8, optical signals are input through the upper input port (first port) and output through the upper output port (third port), and FIG. 9 shows the wavelength dispersion characteristics and wavelength loss characteristics of a path (an optical path) wherein, in the circuit shown in FIG. 9, optical signals are input through the lower input port (second port) and are output through the lower output port (fourth port). As is apparent from FIGS. 8 and 9, these two paths are identical to each other in loss wavelength characteristics and are opposite to each other in wavelength dispersion characteristics. These paths may be connected to each other to mutually cancel the dispersion by taking advantage of this relationship. Although the passband is somewhat narrowed, the blocking characteristics are improved because filtering is performed twice. Therefore, the isolation is doubled. Similarly, a circuit shown in FIG. 10 wherein optical signals are input through the upper input port (first port) and are output through the lower output port (fourth port), and a circuit shown in FIG. 11 wherein optical signals are input through the lower input port (second port) and are output through the upper output port (third port), are identical to each other in wavelength loss characteristics and are opposite to each other in wavelength dispersion characteristics. Two-stage connection of the three multistage Mach-Zehnder interference circuits so as to cancel the dispersion by taking advantage of this relationship can realize an optical multiplexer/demultiplexer wherein the dispersion is theoretically zero.

In the preferred embodiment shown in FIG. 1, the first port in the Mach-Zehnder interference circuit 2a is an input port 3, and the third and fourth ports in the Mach-Zehnder interference circuit 2a are connected to the second port in the Mach-Zehnder interference circuit 2b and the second port in the Mach-Zehnder interference circuit 2c, respectively. Light input through the input port 3 is output through the output port 4 (the fourth port in the Mach-Zehnder interference circuit 2b) or the output port 5 (the third port in the Mach-Zehnder interference circuit 2c) according to wavelengths of the light.

On the other hand, in another preferred embodiment shown in FIG. 2, the first port in the Mach-Zehnder interference circuit 2a is an input port 3, and the third and fourth ports in the Mach-Zehnder interference circuit 2a are connected to the fourth port in the Mach-Zehnder interference circuit 2b and the third port in the Mach-Zehnder interference circuit 2c, respectively. Light input through the input port 3 is output through the output port 4 (the second port in the Mach-Zehnder interference circuit 2b) or the output port 5 (the second port in the Mach-Zehnder interference circuit 2c) according to wavelengths of the light.

For both the preferred embodiments, for example, when optical signals $_{1, 2, 3, 4}$ with wavelength intervals of 0.4 nm are input through the input port 3, the optical signals $_{1, 3}$ are output from the output port 4 while the optical signals $_{2, 4}$ are output from the output port 5. In this connection, the Mach-Zehnder interference circuits are connected to each other so that the wavelength dispersion caused in the Mach-Zehnder interference circuit 2a is cancelled by the Mach-Zehnder interference circuit 2c.

Figure 4:
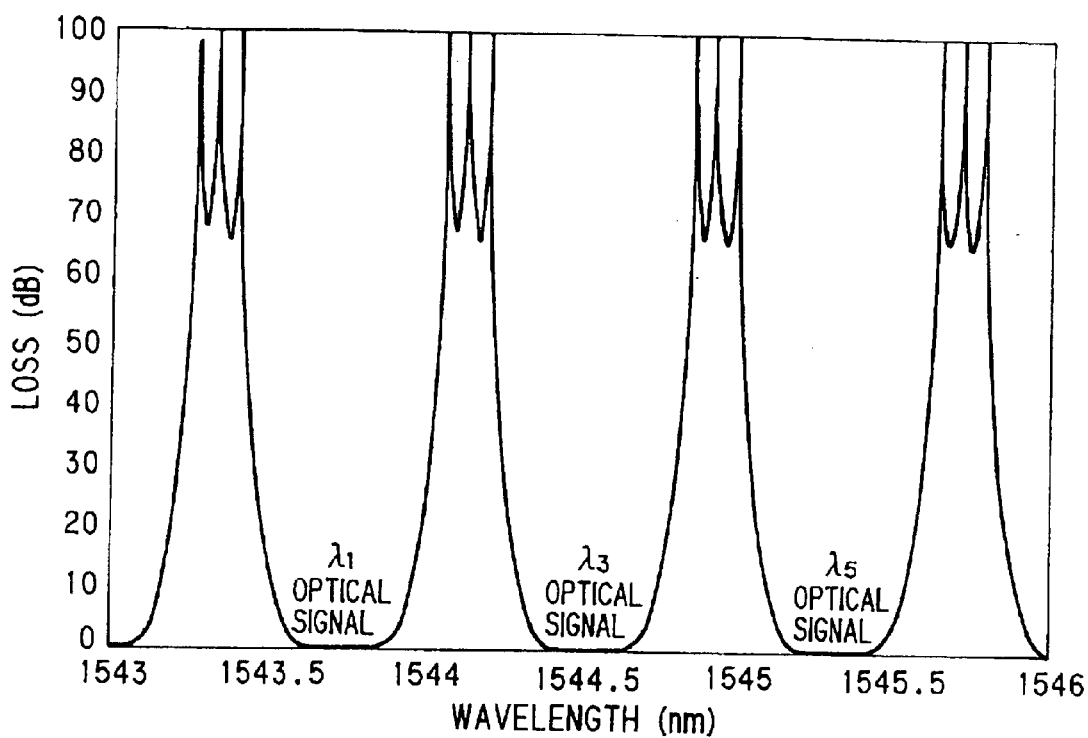
FIG. 4 is an explanatory view showing wavelength loss characteristics in an output port 4 of an optical multiplexer/demultiplexer according to the invention.
Figure 5:
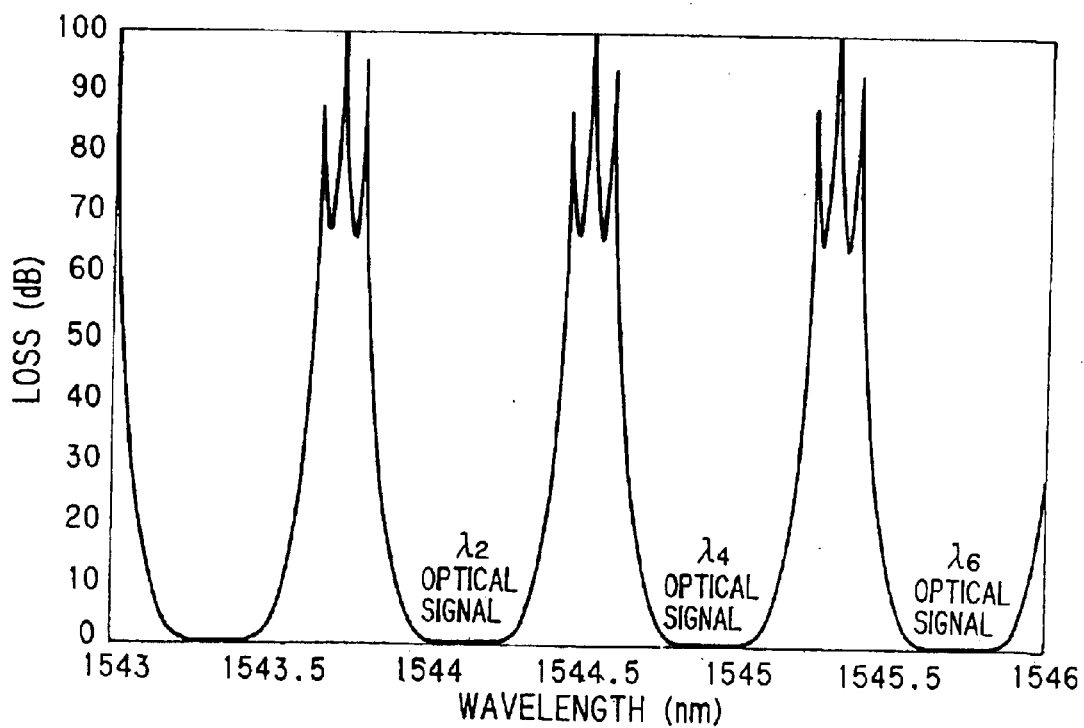
FIG. 5 is an explanatory view showing wavelength loss characteristics in an output port 5 of an optical multiplexer/demultiplexer according to the invention.
Figure 6:
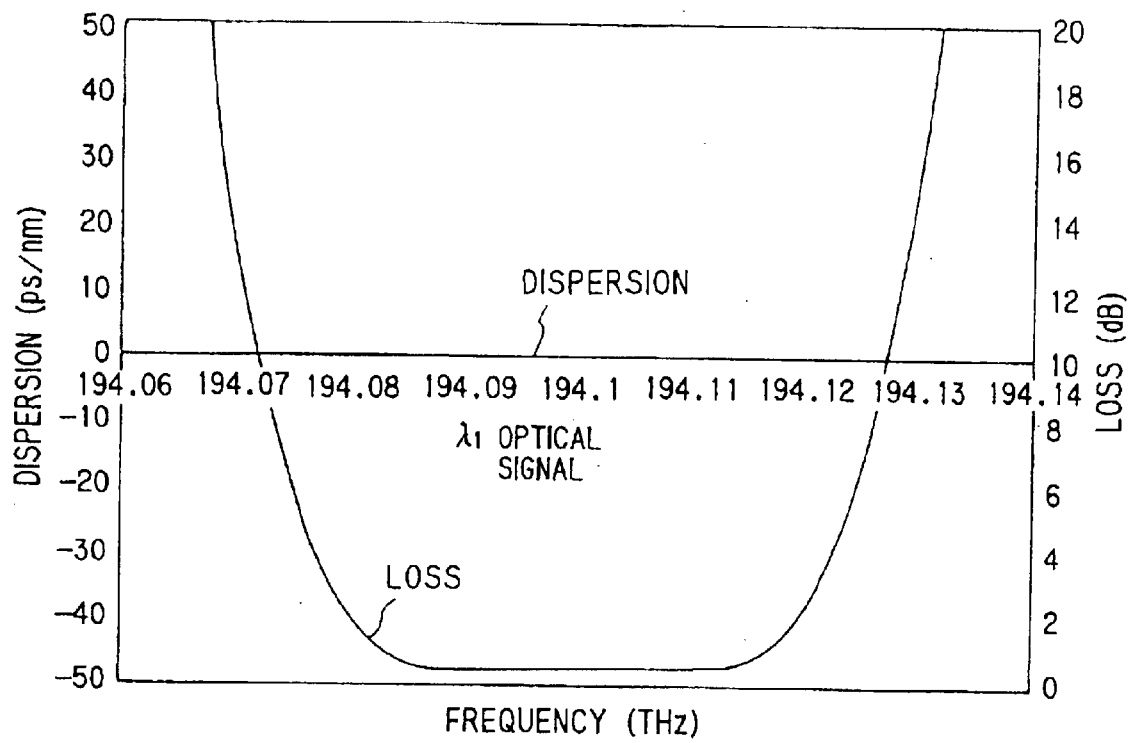
FIG. 6 is an explanatory view showing wavelength loss characteristics in an output port 4 of an optical multiplexer/demultiplexer according to the invention.
Figure 7:
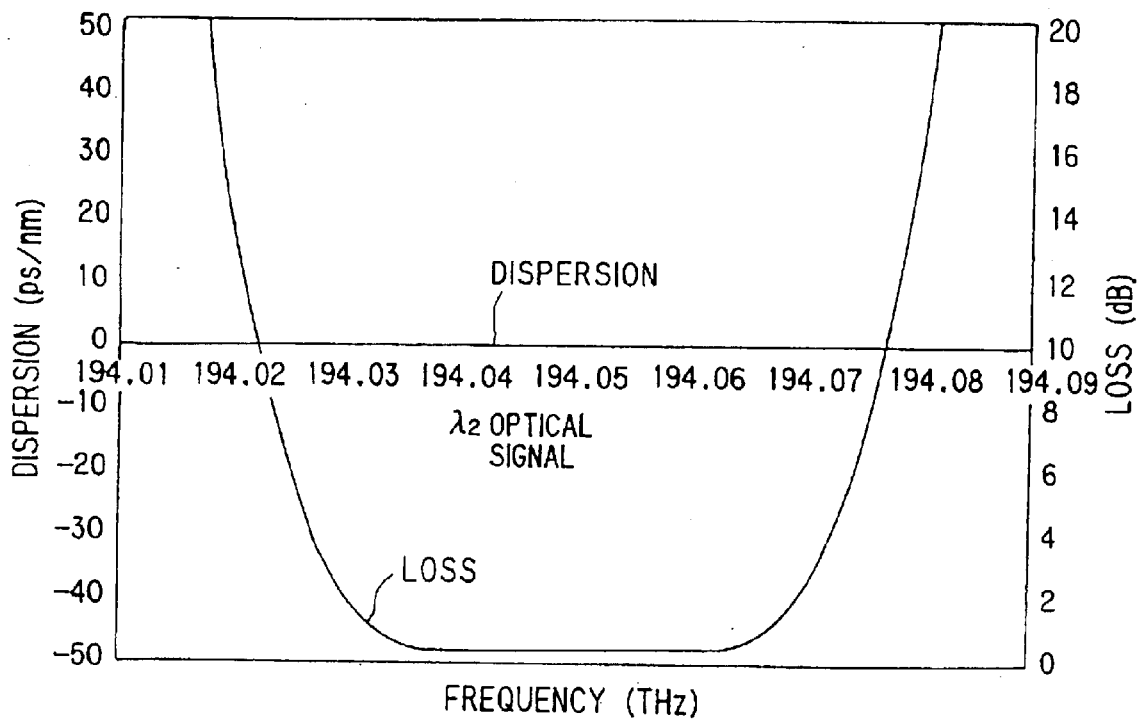
FIG. 7 is an explanatory view showing wavelength loss characteristics in an output port 5 of an optical multiplexer/demultiplexer according to the invention.

FIGS. 4 to 7 show the optical characteristics of this preferred embodiment shown in FIG. 1. FIG. 4 shows the wavelength loss characteristics of an output port 4 in the case where optical signals are input through an input port 3, FIG. 5 the wavelength loss characteristics of an output port 5, and FIG. 6 the wavelength loss characteristics and wavelength dispersion characteristics of the passband in the output port 4. As can be seen from the drawing, wavelength flatness is achieved for the loss in the passband, and, at the same time, the dispersion is substantially zero over the whole passband. Similarly, FIG. 7 shows the wavelength loss characteristics and wavelength dispersion characteristics for the passband in the output port 5. As can be seen from FIG. 7, the dispersion is substantially zero while maintaining the wavelength flatness of loss.

The optical circuit according to this preferred embodiment is a quartz-based plane optical wave circuit provided on a quartz substrate 1. This circuit is prepared as follows. A core glass layer is formed by sputtering and then patterned by photolithography and etching. A cladding is then formed thereon by plasma CVD. The core is formed of $GeO_2$— or $TiO_2$-doped $SiO_2$, the cladding is formed of $SiO_2$, and the substrate is also formed of $SiO_2$. After the preparation of the device, a $CO_2$ laser is preferably applied to correct an error involved in the preparation. The device preparation process, however, is not limited to this only, and any waveguide preparation process commonly used in the art is applicable.

Figure 17:
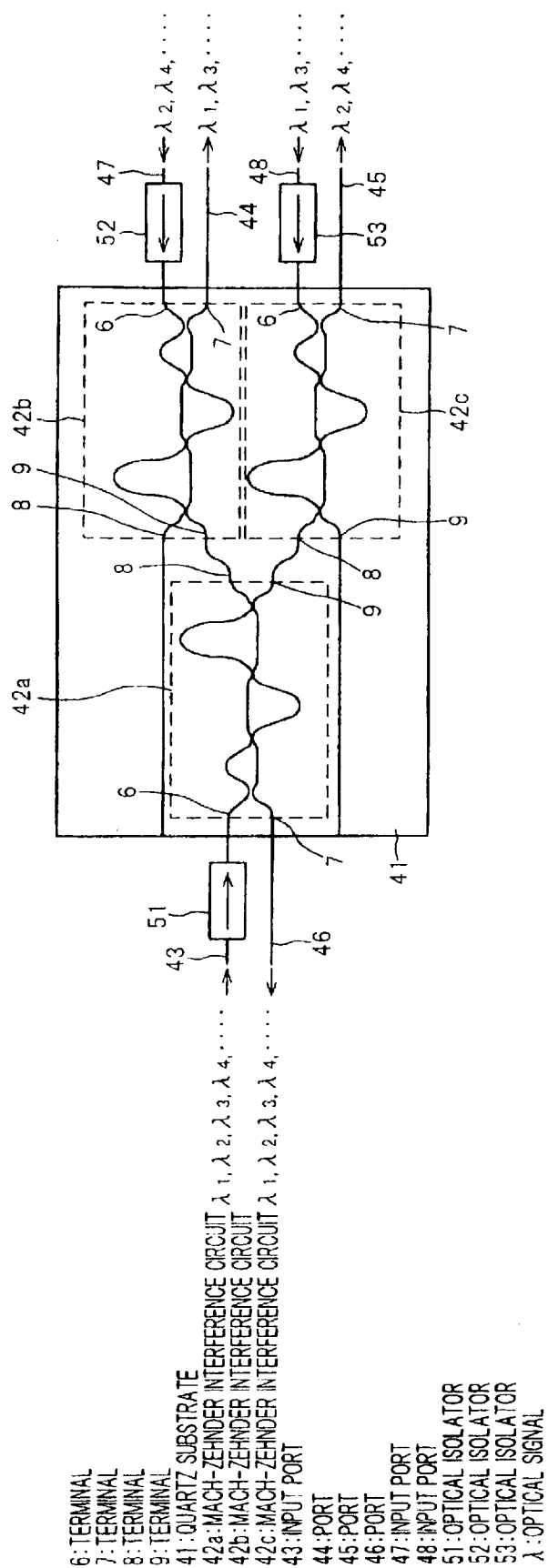
FIG. 17 is a plan view illustrating another preferred embodiment of the optical multiplexer/demultiplexer according to the invention.

FIG. 17 shows another preferred embodiment of the optical multiplexer/demultiplexer according to the invention. The optical multiplexer/demultiplexer shown in FIG. 17 has three Mach-Zehnder interference circuits 42a, 42b, 42c which are respectively the same as the Mach-Zehnder interference circuits 2a, 2b, 2c shown in FIG. 2. The optical multiplexer/demultiplexer shown in FIG. 17 is different from the optical multiplexer/demultiplexer shown in FIG. 2 in that the Mach-Zehnder interference circuit 2a in its second port (terminal 7) opened in the optical multiplexer/demultiplexer shown in FIG. 2 is utilized as an output port in the Mach-Zehnder interference circuit 42a shown in FIG. 17, that the Mach-Zehnder interference circuits 2b and 2c in their respective first ports opened in the optical multiplexer/demultiplexer shown in FIG. 2 are utilized as an input port in each of the Mach-Zehnder interference circuits 42b and 42c, and that an optical isolator 51 is interposed between the optical multiplexer/demultiplexer in its input port 43 and the Mach-Zehnder interference circuit 42a in its first port (terminal 6), an optical isolator 52 is interposed between the optical multiplexer/demultiplexer in its input port 47 and the Mach-Zehnder interference circuit 42b in its first port (terminal 6), and an optical isolator 53 is interposed between the optical multiplexer/demultiplexer in its input port 48 and the Mach-Zehnder interference circuit 42c in its first port (terminal 6).

The combination of the three Mach-Zehnder interference circuits 42a, 42b, 42c in the optical multiplexer/ demultiplexer shown in FIG. 17 has the same characteristics as the combination of the three Mach-Zehnder interference circuits 2a, 2b, 2c in the optical multiplexer/demultiplexer shown in FIG. 2. Therefore, when an optical signal with $\lambda_1$, $\lambda_2$, $\lambda_3$, $\lambda_4$ is input through the input port 43, the optical multiplexer/demultiplexer shown in FIG. 17 functions as an optical demultiplexer with respect to optical signals $\lambda_1$, $\lambda_3$ and $\lambda_2$, $\lambda_4$ output respectively through the second ports (terminal 7) of the Mach-Zehnder interference circuits 42b and 42c, that is, ports 44 and 45 of the optical multiplexer/demultiplexer. In this case, independently of the presence of the optical isolator 51, the path of the optical signal in the optical multiplexer/demultiplexer shown in FIG. 17 is the same as that in the optical multiplexer/demultiplexer shown in FIG. 2. Therefore, the wavelength dispersion characteristics are offset.

On the other hand, when optical signals with different wavelengths, that is, an optical signal with $\lambda_2$, $\lambda_4$ and an optical signal with $\lambda_1$, $\lambda_3$, are input from the input ports 47, 48 respectively through the optical isolators 52, 53, a multiplexed optical signal with $\lambda_1$, $\lambda_2$, $\lambda_3$, $\lambda_4$ is output from the second port (terminal 7) of the Mach-Zehnder interference circuit 42a, that is, the port 46 of the optical multiplexer/demultiplexer. That is, the optical multiplexer/demultiplexer shown in FIG. 17 functions as an optical multiplexer. This means that the optical multiplexer/demultiplexer shown in FIG. 17 can function simultaneously as one optical multiplexer and as one optical demultiplexer.

Regarding the optical signal which is input through the input ports 47, 48, multiplexed and then output through the port 46, the wavelength dispersion characteristics of the third optical path, which leads from the first port of the Mach-Zehnder interference circuit 42b to the fourth port (terminal 9), are opposite to those of the fourth optical path which leads from the third port (terminal 8) of the Mach-Zehnder interference circuit 42a to the second port (terminal 7). At the same time, the wavelength dispersion characteristics of the first optical path, which leads from the first port (terminal 6) of the Mach-Zehnder interference circuit 42c to the third port (terminal 8), are opposite to those of the second optical path which leads from the fourth port (terminal 9) of the Mach-Zehnder interference circuit 42a to the second port (terminal 7). For all the paths, the wavelength dispersion characteristics are offset, and the wavelength dispersion is theoretically zero.

Figure 12:
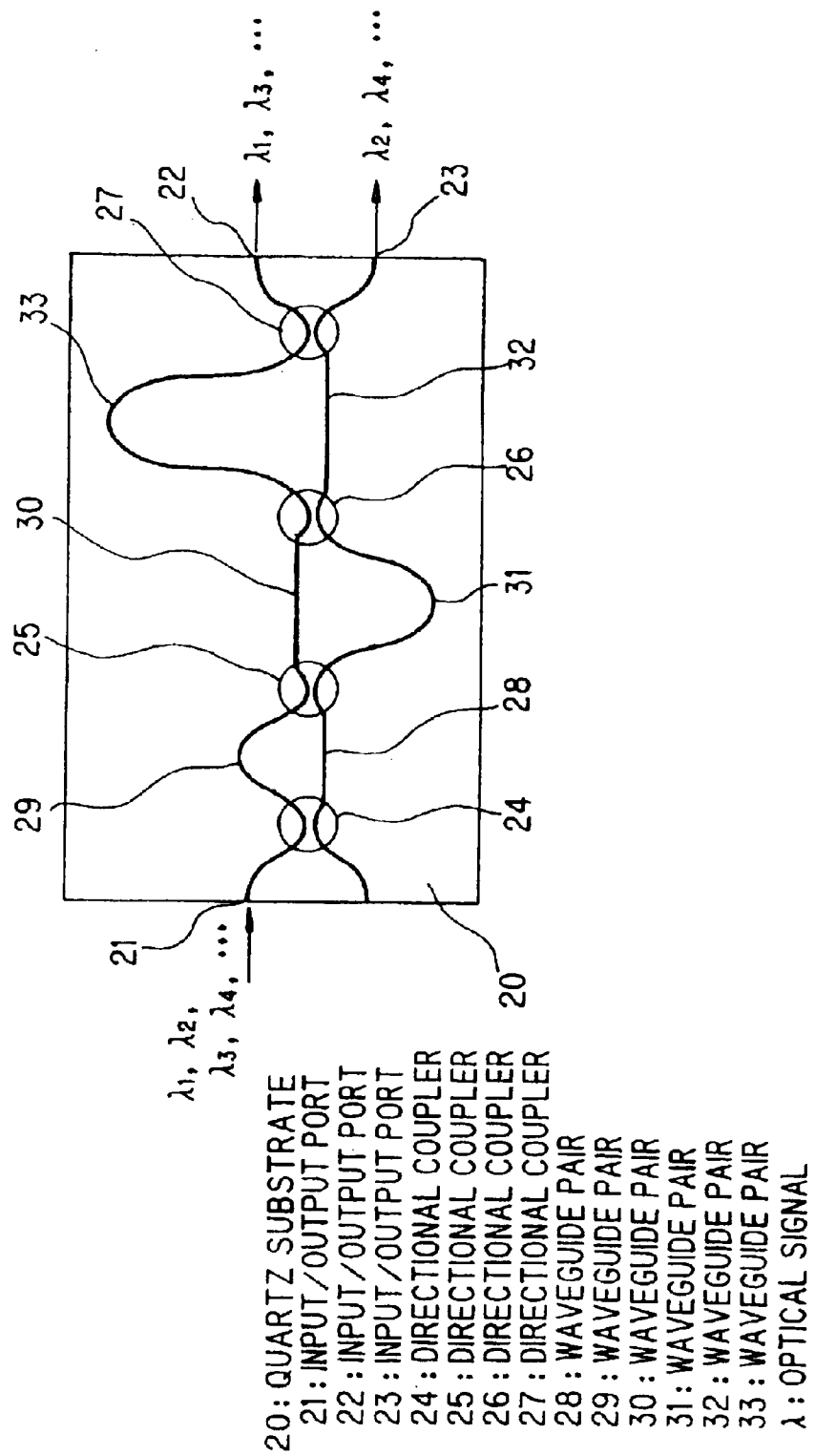
FIG. 12 is an explanatory view showing a prior art technique.
Figure 13:
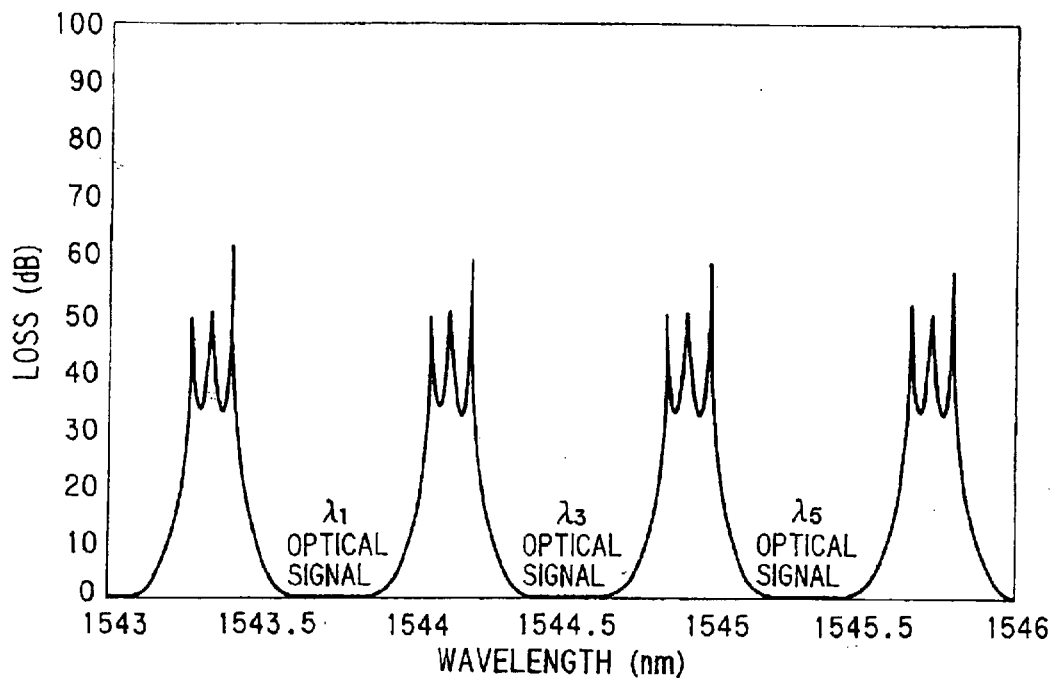
FIG. 13 is an explanatory view showing the wavelength loss characteristics of a prior art technique.
Figure 14:
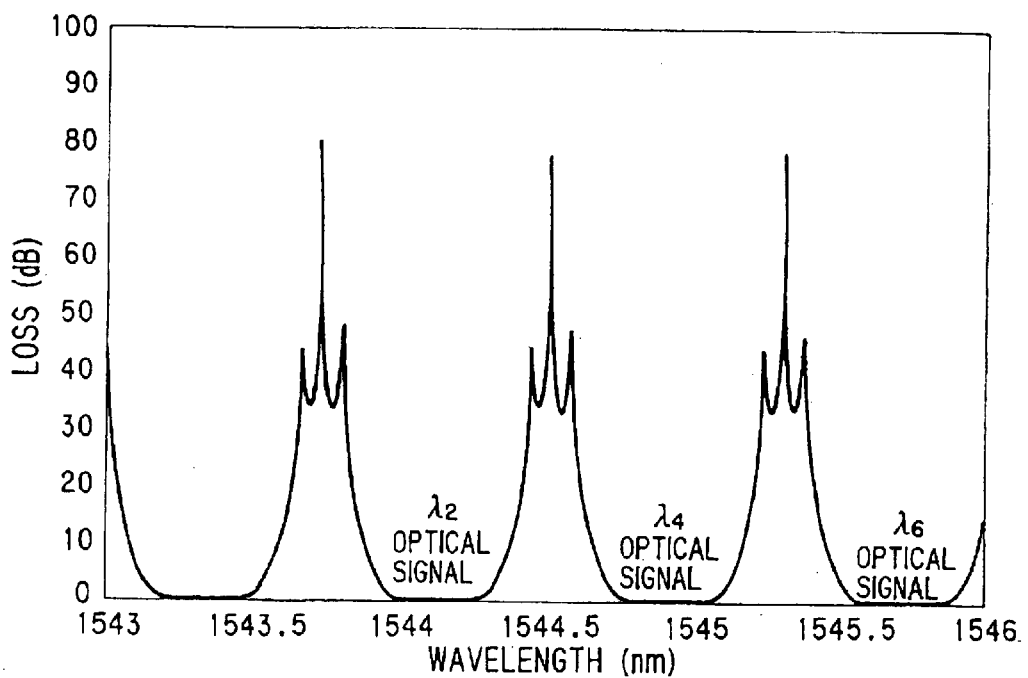
FIG. 14 is an explanatory view showing the wavelength loss characteristics of a prior art technique.
Figure 15:
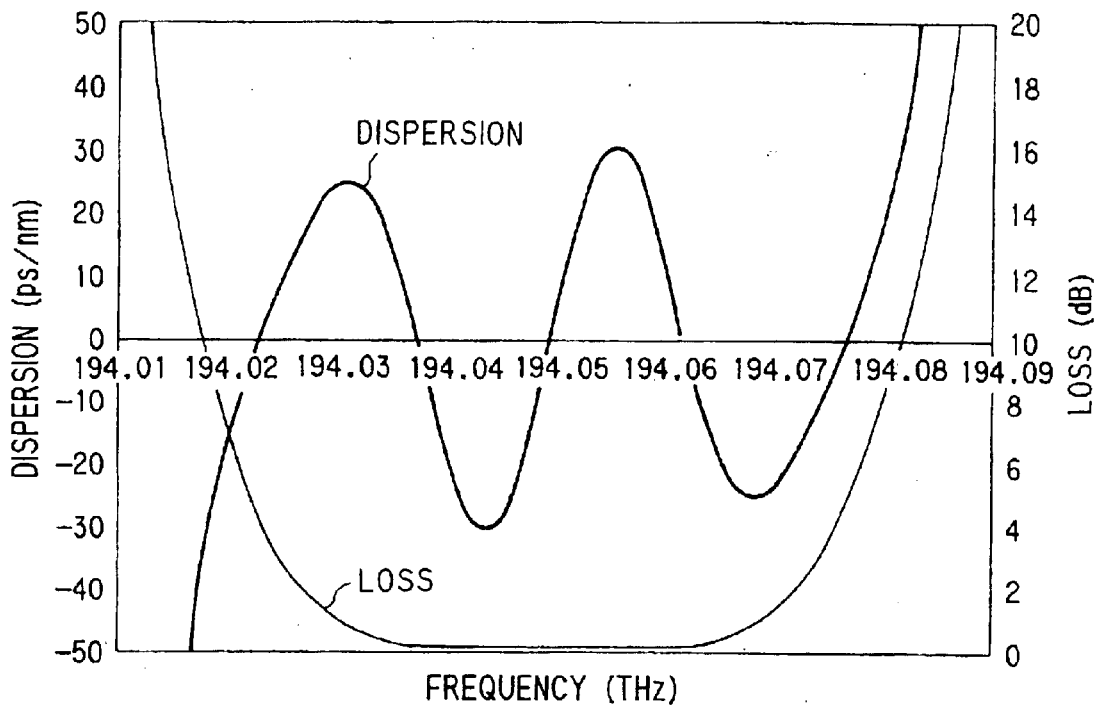
FIG. 15 is an explanatory view showing the wavelength dispersion characteristics and wavelength loss characteristics in a passband of a prior art technique.
Figure 16:
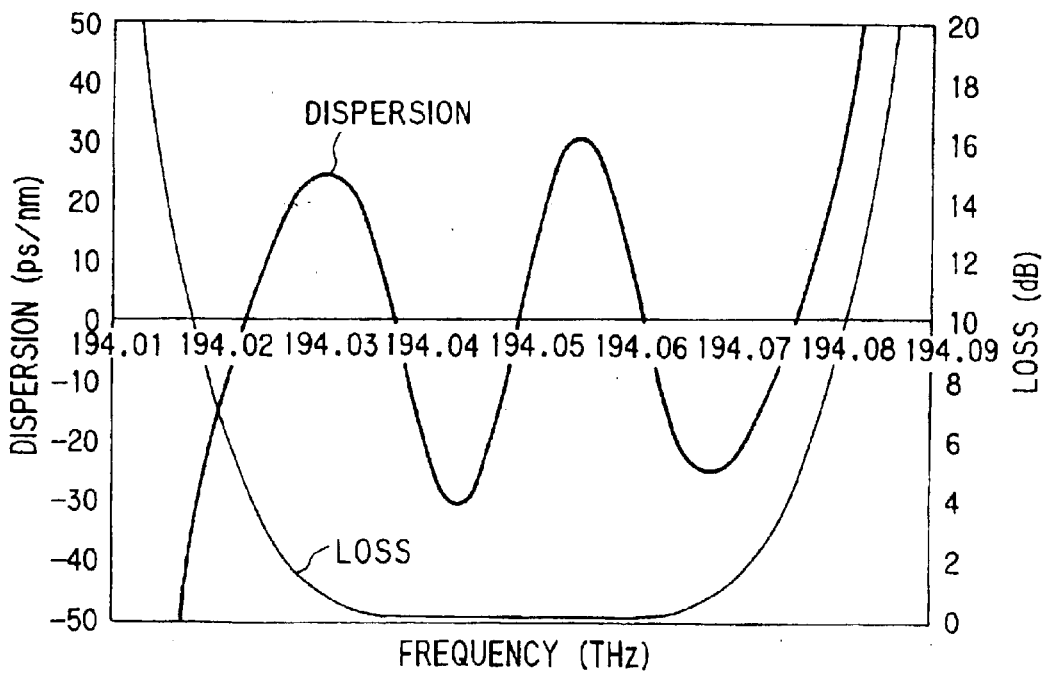
FIG. 16 is an explanatory view showing the wavelength dispersion characteristics and wavelength loss characteristics in a passband of a prior art technique.
Figure 18:
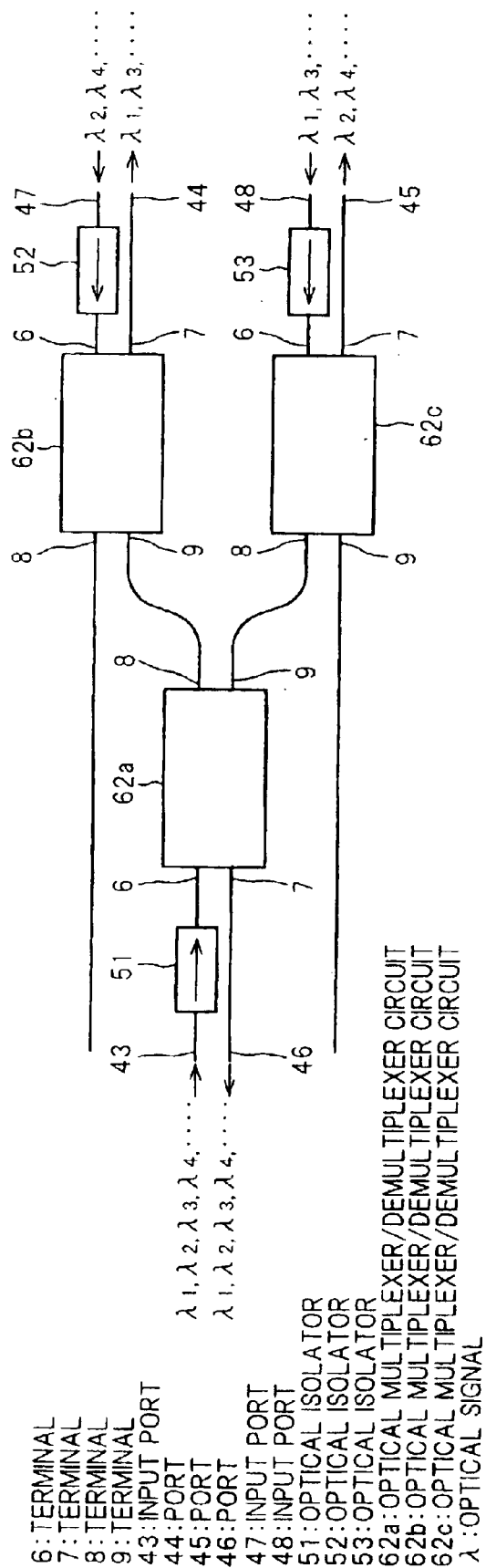
FIG. 18 is a conceptual view of an optical multiplexer/demultiplexer wherein the Mach-Zehnder interference circuits have been replaced by equivalent optical multiplexer/demultiplexer circuits.

It is a matter of course that (equivalent) optical multiplexer/demultiplexer circuits having the same function as the Mach-Zehnder interference circuits 42a, 42b, 42c of the optical multiplexer/demultiplexer shown in FIG. 12 can be substituted for the Mach-Zehnder interference circuits 42a, 42b, 42c. FIG. 18 shows a conceptual view of an optical multiplexer/demultiplexer wherein the terminals 6, 7, 8, and 9 have been replaced with equivalent optical multiplexer/demultiplexer circuits 62a, 62b, 62c.

Figure 19:
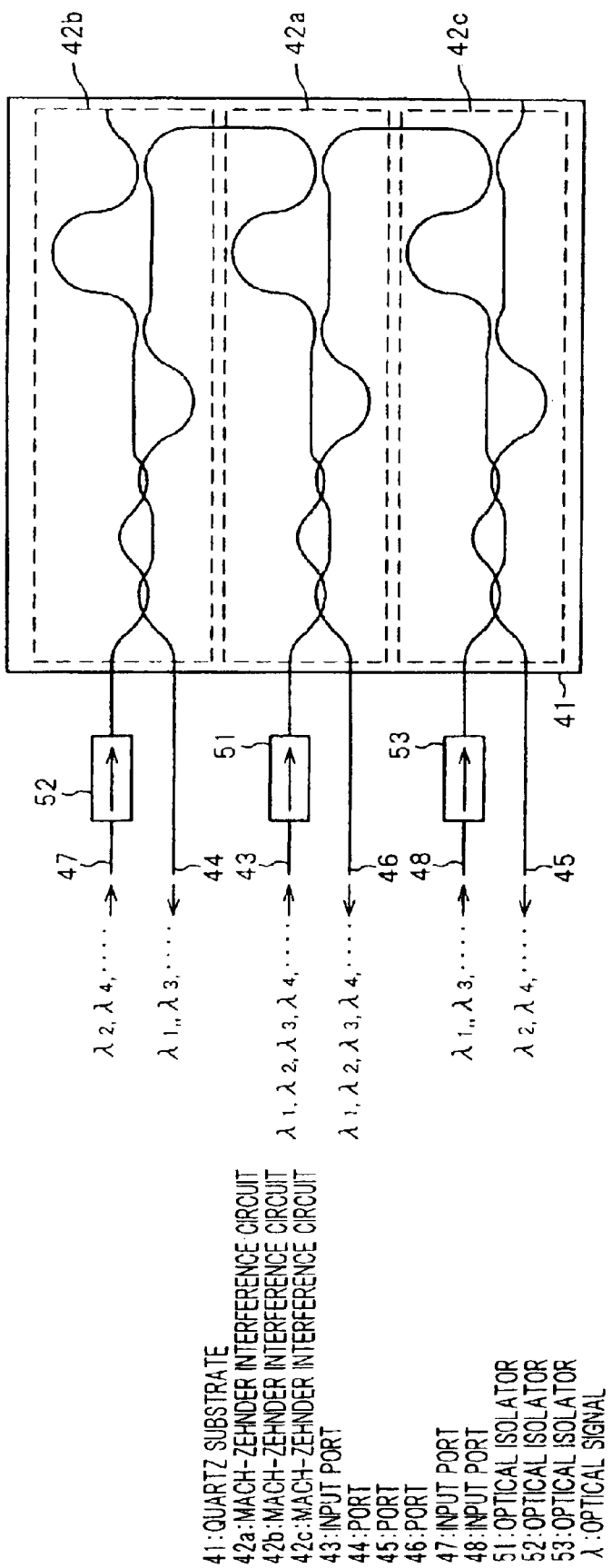
FIG. 19 is a plan view illustrating another layout of the optical multiplexer/demultiplexer shown in FIG. 17.

The optical multiplexer/demultiplexer shown in FIG. 17 may have another layout on a quartz substrate 41. FIG. 19 shows an embodiment of the another layout of the optical multiplexer/demultiplexer shown in FIG. 17.

The optical multiplexer/demultiplexer shown in FIG. 17 can be applied to a wavelength multiplexing optical communication system, and is particularly suitable for a bidirectional transmission system. The optical multiplexer/demultiplexer according to the invention is not limited to those using waveguides, and optical fiber-type couplers may also be used.

An optical isolator having an isolation of about 20 dB was provided, and was fused and fixed to a waveguide module.

In this optical multiplexer/demultiplexer, when an optical signal with $\lambda_1$, $\lambda_2$, $\lambda_3$, $\lambda_4$ of a wavelength spacing of 0.4 nm is input from the input port 43 into the first port (terminal 6) of the Mach-Zehnder interference circuit 42a through the optical isolator 51, an optical signal with $\lambda_1$, $\lambda_3$ is output through the port 44, and the optical signal with $\lambda_2$, $\lambda_4$ is output through the port 45. As described above, regarding the optical path, which leads from the input port 43 to the port 44, and the optical path, which leads from the input port 43 to the port 45, the wavelength dispersion characteristics of the Mach-Zehnder interference circuits connected to each other are mutually offset. Therefore, the optical multiplexer/demultiplexer shown in FIG. 17 functions as an optical demultiplexer of which the dispersion is theoretically zero.

Figure 20:
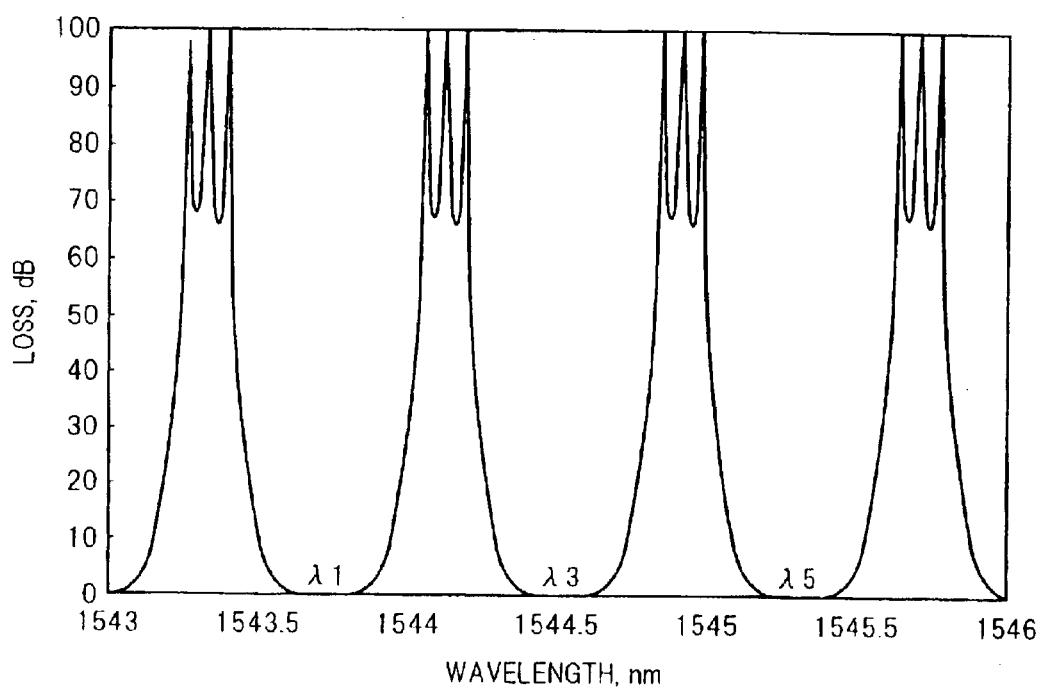
FIG. 20 is a graph showing wavelength loss characteristics.
Figure 21:
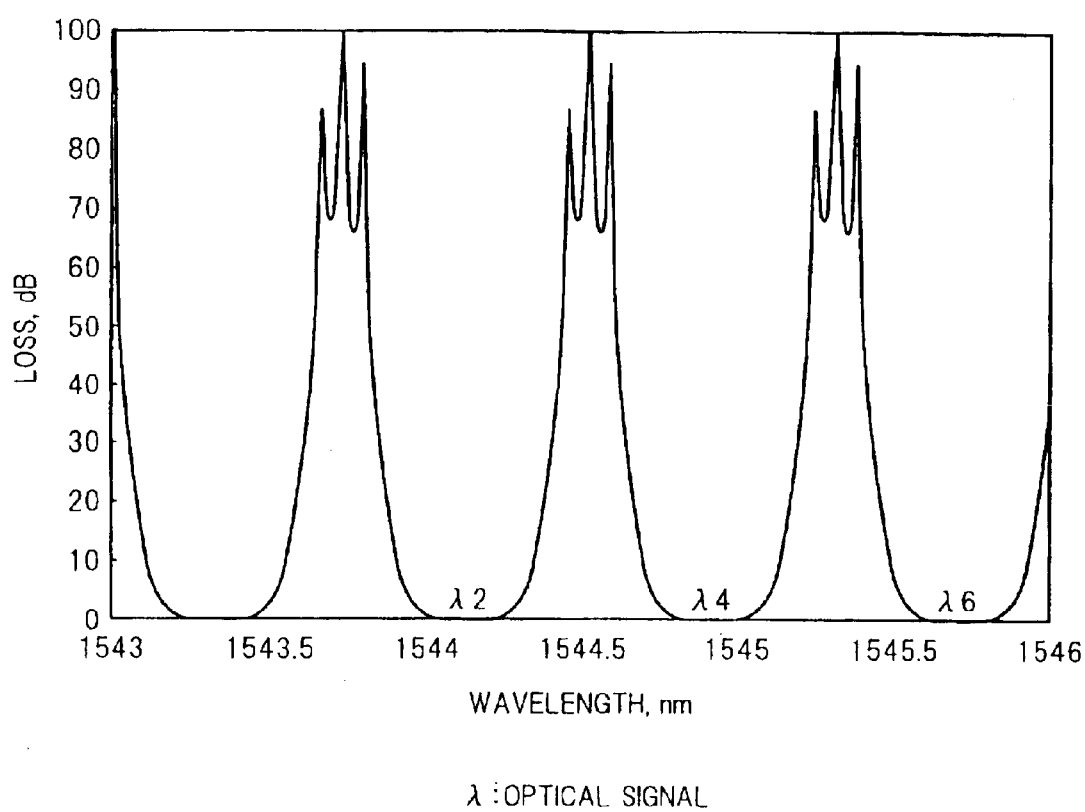
FIG. 21 is a graph showing wavelength loss characteristics.

FIG. 20 shows wavelength loss characteristics in the case where an optical signal has been input through the input port 43 and output through the port 44. FIG. 21 shows wavelength loss characteristics in the case where an optical signal is input through the input port 43 and output through the port 45. For wavelengths $\lambda_1$, $\lambda_3$ or wavelengths $\lambda_2$, $\lambda_4$, the wavelength loss is zero (0) dB.

Figure 24:
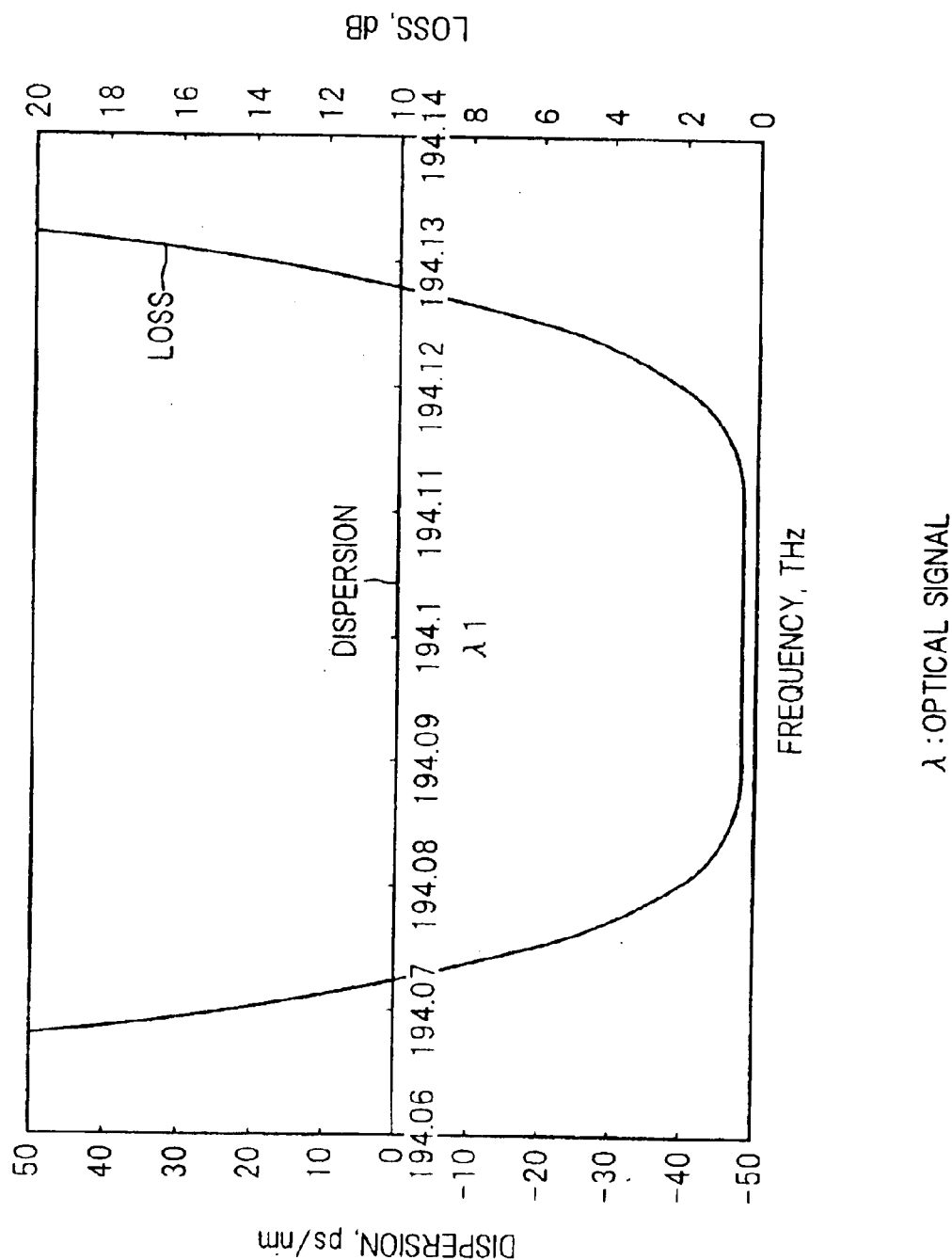
FIG. 24 is a graph showing wavelength dispersion characteristics in a wavelength passband of an optical path.
Figure 25:
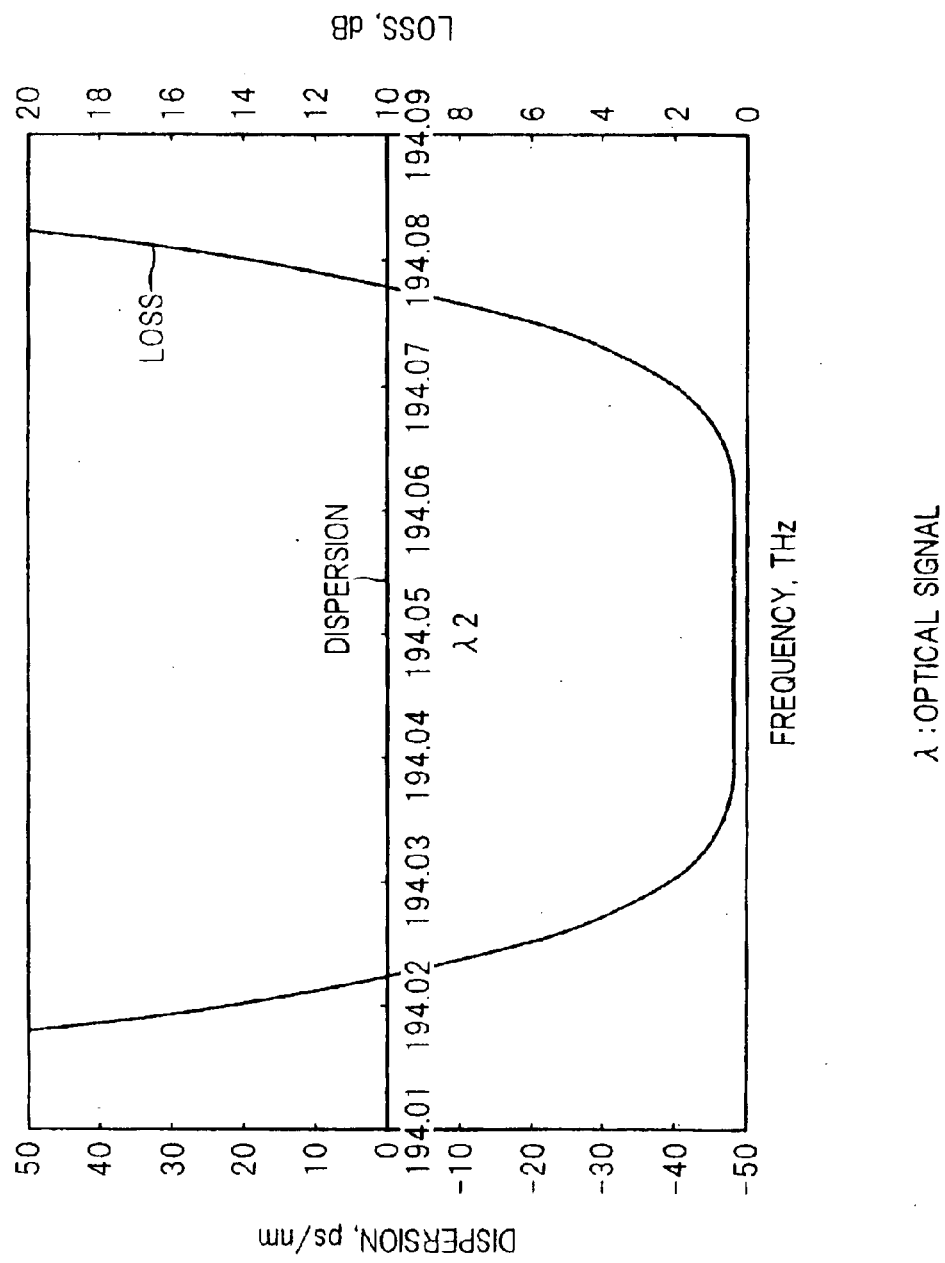
FIG. 25 is a graph showing wavelength dispersion characteristics in a wavelength passband of an optical path.

FIG. 24 shows the wavelength dispersion characteristics in a wavelength passband of the optical path which leads from the input port 43 to the port 44, and FIG. 20 the wavelength dispersion characteristics in a wavelength passband of the optical path which leads from the input port 43 to the port 45.

When an optical signal with $\lambda_2$, $\lambda_4$ is input through the input port 47 into the first port (terminal 6) of the Mach-Zehnder interference circuit 42b through the optical isolator 52 while an optical signal with $\lambda_1$, $\lambda_3$ is input through the input port 48 into the first port (terminal 6) of the Mach-Zehnder interference circuit 42c through the optical isolator 53, a multiplexed optical signal with $\lambda_1$, $\lambda_2$, $\lambda_3$, $\lambda_4$ is output through the port 46. As described above, regarding the optical path, which leads from the input port 47 to the port 46, and the optical path which leads from the input port 48 to the port 46, the wavelength dispersion characteristics of the Mach-Zehnder interference circuits connected to each other are mutually offset. Therefore, the optical multiplexer/demultiplexer shown in FIG. 17 can function as an optical demultiplexer of which the dispersion is theoretically zero.

Figure 22:
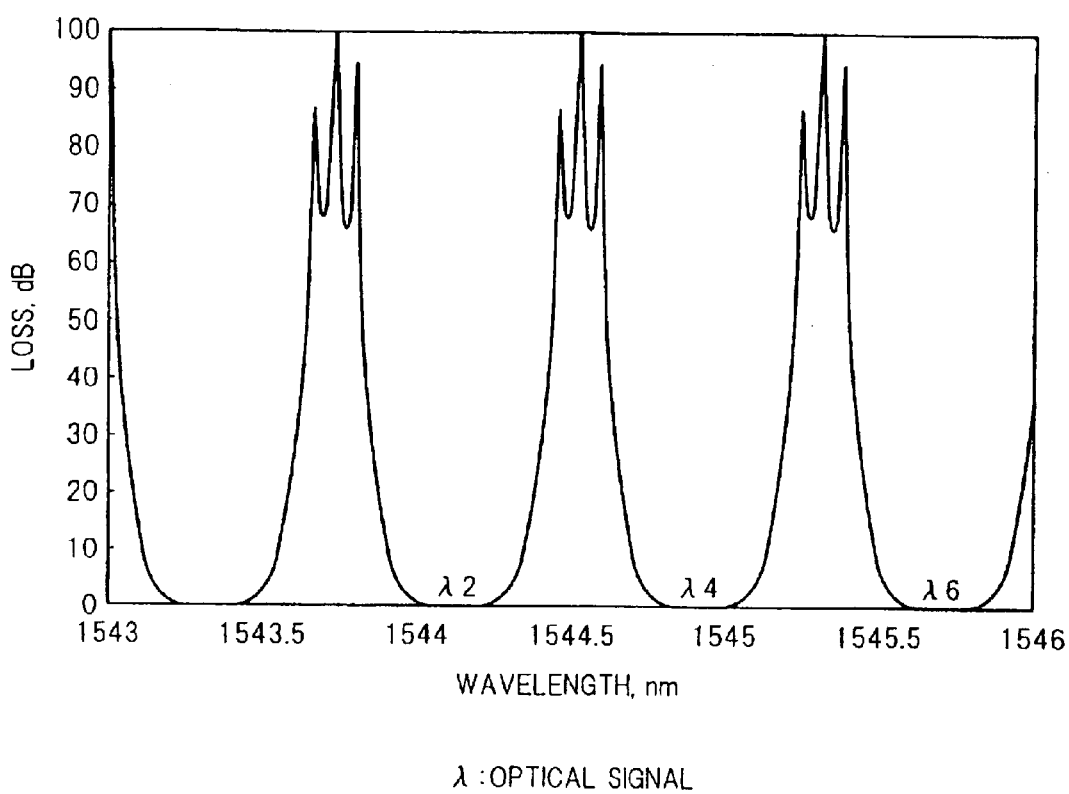
FIG. 22 is a graph showing wavelength loss characteristics.
Figure 23:
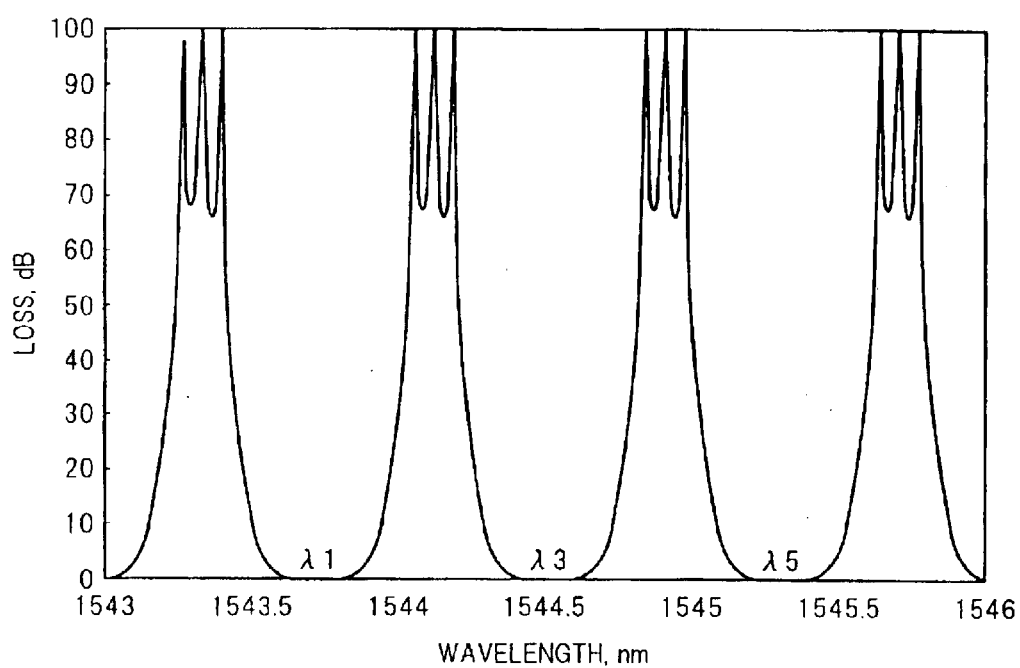
FIG. 23 is a graph showing wavelength loss characteristics.

FIG. 22 shows wavelength loss characteristics in the case where an optical signal has been input through the input port 47 and output through the port 46. FIG. 23 shows wavelength loss characteristics in the case where an optical signal is input into the input port 48 and is output through the port 46. For wavelengths $\lambda_2$, $\lambda_4$ or wavelengths $\lambda_1$, $\lambda_3$, the wavelength loss is zero (0) dB.

Figure 26:
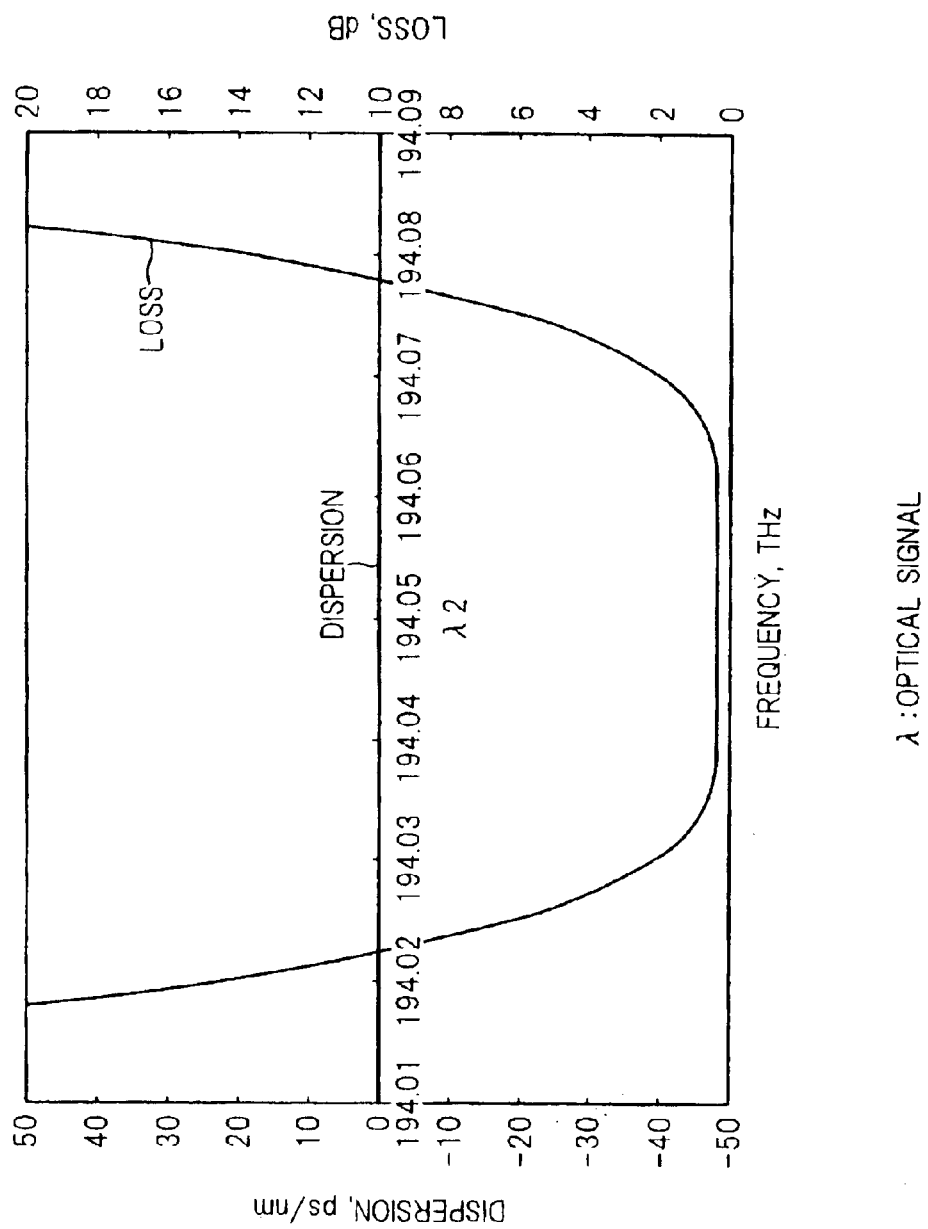
FIG. 26 is a graph showing wavelength dispersion characteristics in a wavelength passband of an optical path.
Figure 27:
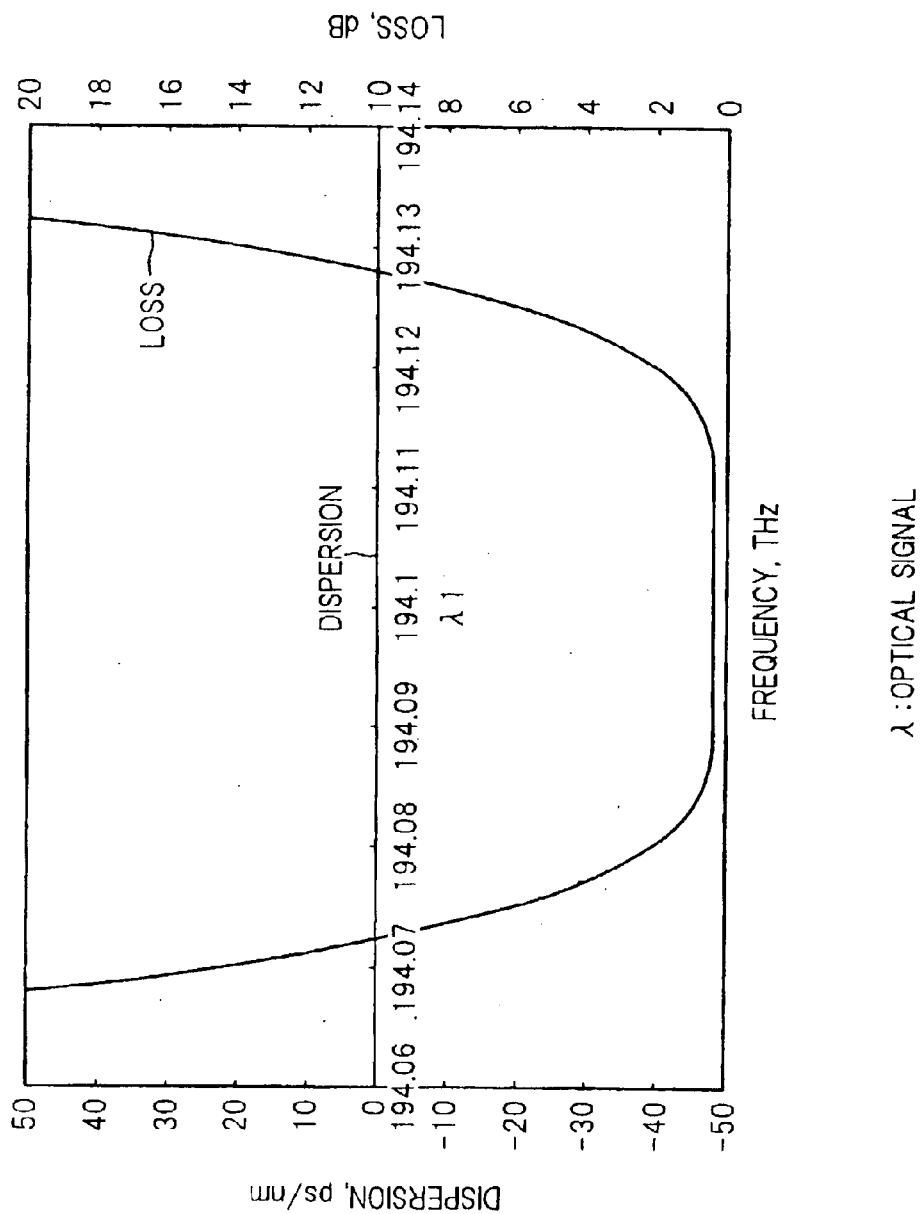
FIG. 27 is a graph showing wavelength dispersion characteristics in a wavelength passband of an optical path.

FIG. 26 shows the wavelength dispersion characteristics in a wavelength passband of the optical path which leads from the input port 47 to the port 46, and FIG. 27 the wavelength dispersion characteristics in a wavelength passband of the optical path which leads from the input port 48 to the port 46.

Figure 28:
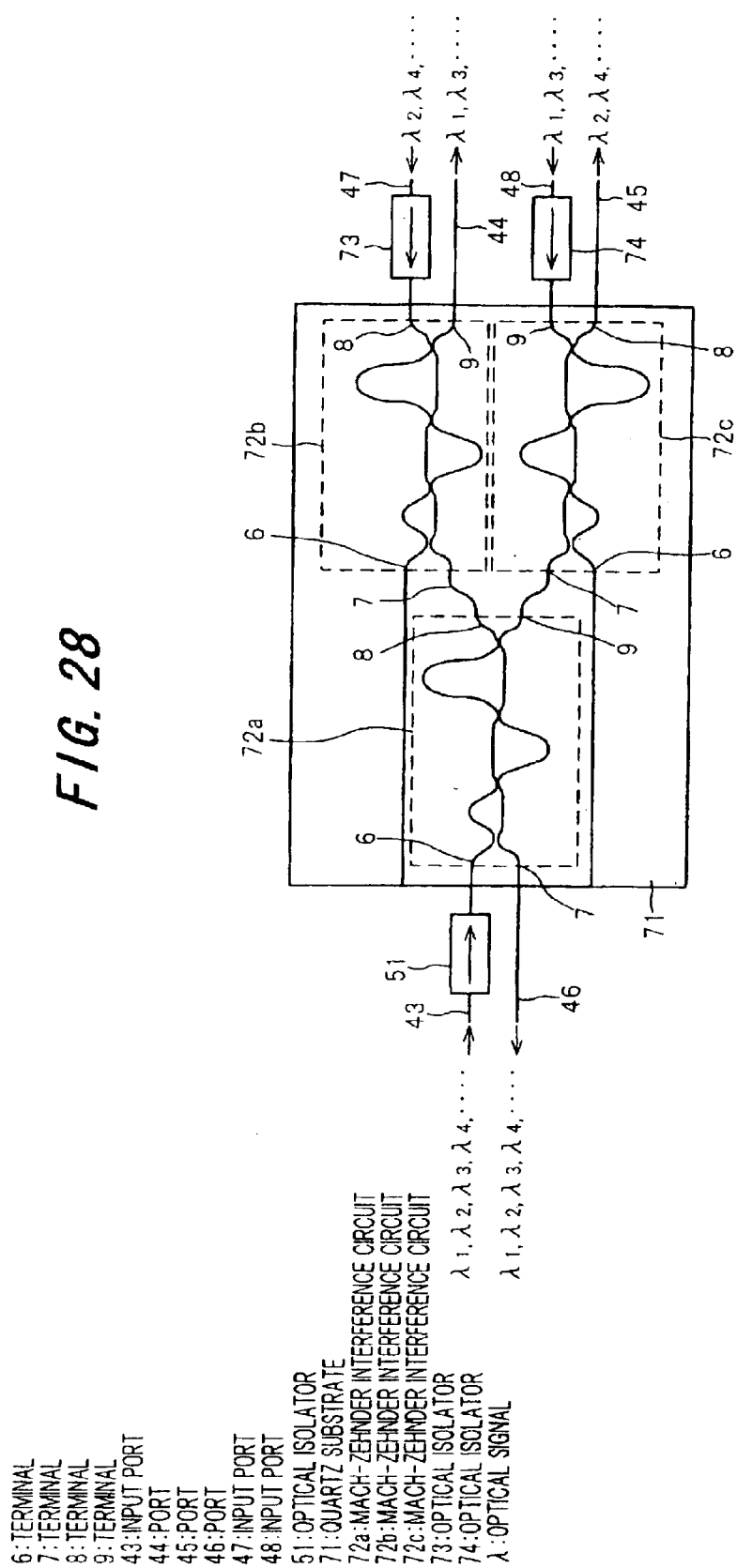
FIG. 28 is a plan view illustrating a further preferred embodiment of the optical multiplexer/demultiplexer according to the invention.

Further, a construction as shown in FIG. 28 may be adopted. Specifically, in an optical multiplexer/demultiplexer wherein a first Mach-Zehnder interference circuit 72a in its third port (terminal 8) has been connected to a second port (terminal 7) of a second Mach-Zehnder interference circuit 72b and, likewise, the first Mach-Zehnder interference circuit 72a in its fourth port (terminal 9) is connected to a second port (terminal 7) of a third Mach-Zehnder interference circuit 72c, optical isolators 73 and 74 are provided respectively on the third port (terminal 8) of the Mach-Zehnder interference circuit 72b and the fourth port (terminal 9) of the Mach-Zehnder interference circuit 72c, and optical signals may be input thorough these optical isolators. In this case, the second object of the invention, that is, simultaneous use of a single optical multiplexer/demultiplexer in multiplexing purposes and demultiplexing purposes, can be attained. However, the wavelength dispersion of the optical signal after multiplexing output from the second port (terminal 7=port 46) of the first Mach-Zehnder interference circuit 72a is not zero (0), and is slightly increased. Therefore, the use of this construction as an optical multiplexer, wherein an optical isolator is inserted into the input side and the first Mach-Zehnder interference circuit is used as the output side, is somewhat disadvantageous.

Although the preferred embodiments have been described by taking a waveguide type as an example, the construction can be realized, for example, by using an optical fiber-type coupler.

As is apparent from the foregoing description, the present invention has the following effects.

(1) An optical multiplexer/demultiplexer can be provided which does not cause any wavelength dispersion and, at the same time, has excellent wavelength flatness in the passband.

(2) The optical multiplexer/demultiplexer is connected in two stages. Therefore, filtering is performed twice, leading to improved isolation characteristics.

(3) Optical signals can be multiplexed and demultiplexed without increasing wavelength dispersion. This can realize an increased transmission speed and an increased relay distance in a wavelength multiplexing communication system.

(4) A single optical multiplexer/demultiplexer can simultaneously function as one optical multiplexer and as one optical demultiplexer. This can reduce a space for optical multiplexer/demultiplexers necessary for multiplexing and demultiplexing of a plurality of optical signals different from each other in signal source, and, at the same time, can reduce the cost.

The invention has been described in detail with particular reference to preferred embodiments, but it will be understood that variations and modifications can be effected within the scope of the invention as set forth in the appended claims.

What is claimed is:

1. An optical multiplexer/demultiplexer, comprising:
   (a) first, second and third optical multiplexer/demultiplexer circuits that include:
      first, second, third and fourth ports;
      a first optical path that has said first and third ports as terminals;
      a second optical path that has said first and fourth ports as terminals;
      a third optical path that has said second and fourth ports as terminals and that has the same wavelength loss characteristics as said first optical path and the same absolute-value wavelength dispersion characteristics as said first optical path, the sign of the wavelength dispersion characteristics being opposite to each other between the first and third optical paths; and
      a fourth optical path that has said second and third ports as terminals and that has the same wavelength loss characteristics as said second optical path and the same absolute-value wavelength dispersion characteristics as said second optical path, the sign of the wavelength dispersion characteristics being opposite to each other between the second and fourth optical paths;
   wherein Mach-Zehnder interference circuits are connected in series and in multistage and at least of one pair of said first, second and third optical multiplexer/demultiplexer circuits are placed in mirror image relation;
   (b) an optical path that lies connecting said first optical path of the said first optical multiplexer/demultiplexer circuit and said third optical path of the said second optical multiplexer/demultiplexer circuit such that a wavelength dispersion generated in the first optical path of said first optical multiplexer/demultiplexer circuit is compensated by said second optical multiplexer/demultiplexer circuit; and
   (c) an optical path that lies connecting said second optical path of the said first optical multiplexer/demultiplexer circuit and said fourth optical path of the said third optical multiplexer/demultiplexer circuit such that a wavelength dispersion generated in the second optical path of said first optical multiplexer/demultiplexer circuit is compensated by said third optical multiplexer/demultiplexer circuit.

2. An optical multiplexer/demultiplexer according to claim 1, wherein:
   said first port of said first optical multiplexer/demultiplexer circuit is an input port; and
   said fourth port of said second optical multiplexer/demultiplexer circuit and said third port of said third optical multiplexer/demultiplexer circuit are output ports.

3. An optical multiplexer/demultiplexer according to claim 1, wherein:
   said first port of said first optical multiplexer/demultiplexer circuit is an input port; and
   said second port of said second optical multiplexer/demultiplexer circuit and said second port of said third optical multiplexer/demultiplexer circuit are output ports.

4. An optical multiplexer/demultiplexer, comprising:
   (a) first, second and third optical multiplexer/demultiplexer circuits that include first, second, third and fourth ports;
      a first optical path that has said first and third ports as terminals;
      a second optical path that has said first and fourth ports as terminals;
      a third optical path that has said second and fourth ports as terminals and that has the same wavelength loss characteristics as said first optical path and the same absolute-value wavelength dispersion characteristics as said first optical path, the sign of the wavelength dispersion characteristics being opposite to each other between the first and third optical paths; and
      a fourth optical path that has said second and third ports as terminals and that has the same wavelength loss characteristics as said second optical path and the same absolute-value wavelength dispersion characteristics as said second optical path, the sign of the wavelength dispersion characteristics being opposite to each other between the second and fourth optical paths;
   wherein Mach-Zehnder interference circuits are connected in series and in multistage;
   (b) an optical path that lies connecting said first optical path of the said first optical multiplexer/demultiplexer circuit and said third optical path of the said second optical multiplexer/demultiplexer circuit such that a wavelength dispersion generated in the first optical path of said first optical multiplexer/demultiplexer circuit is compensated by said second optical multiplexer/demultiplexer circuit; and (c) an optical path that lies connecting said second optical path of the said first optical multiplexer/demultiplexer circuit and said fourth optical path of the said third optical multiplexer/demultiplexer circuit such that a wavelength dispersion generated in the second optical path of said first optical multiplexer/demultiplexer circuit is compensated by said third optical multiplexer/demultiplexer circuit;

wherein said first, second and third optical multiplexer/demultiplexer circuits are placed in parallel, and said first optical multiplexer/demultiplexer circuit is placed between said second and third optical multiplexer/demultiplexer circuits.

5. An optical multiplexer/demultiplexer according to claim 4, wherein:

said first port of said first optical multiplexer/demultiplexer circuit is an input port;

said second port of said second optical multiplexer/demultiplexer circuit and said second port of said third optical multiplexer/demultiplexer circuit are output ports;

said first port of said second optical multiplexer/demultiplexer circuit and said first port of said third optical multiplexer/demultiplexer circuit are input ports;

said second port of said first optical multiplexer/demultiplexer circuit is an output port; and said first port of said first optical multiplexer/demultiplexer circuit, said first port of said second optical multiplexer/demultiplexer circuit and said first port of said third optical multiplexer/demultiplexer circuit are each provided with an optical isolator through which an optical signal is inputted.

6. An optical multiplexer/demultiplexer according to claim 4, wherein:

said first port of said first optical multiplexer/demultiplexer circuit is an input port;

said second port of said second optical multiplexer/demultiplexer circuit and said second port of said third optical multiplexer/demultiplexer circuit are output ports;

said first port of said second optical multiplexer/demultiplexer circuit and said first port of said third optical multiplexer/demultiplexer circuit are input ports;

said second port of said first optical multiplexer/demultiplexer circuit is an output port; and said first port of said first optical multiplexer/demultiplexer circuit, said first port of said second optical multiplexer/demultiplexer circuit and said first port of said third optical multiplexer/demultiplexer circuit are each provided with an optical isolator through which an optical signal is inputted.

* * * * *